(12) United States Patent
Sastry et al.

(10) Patent No.: US 8,959,576 B2
(45) Date of Patent: Feb. 17, 2015

(54) METHOD, APPARATUS, SYSTEM FOR QUALIFYING CPU TRANSACTIONS WITH SECURITY ATTRIBUTES

(71) Applicant: Intel Corporation, Santa Clara, CA (US)

(72) Inventors: Manoj R. Sastry, Portland, OR (US); Ioannis T. Schoinas, Portland, OR (US); Daniel M. Cermak, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 28 days.

(21) Appl. No.: 13/828,676

(22) Filed: Mar. 14, 2013

(65) Prior Publication Data

US 2014/0282819 A1 Sep. 18, 2014

(51) Int. Cl.
*G06F 21/62* (2013.01)
(52) U.S. Cl.
CPC ..................................... *G06F 21/62* (2013.01)
USPC ............ 726/1; 726/4; 726/7; 726/22; 726/26; 713/150; 713/164; 713/167; 713/189; 709/203; 709/229
(58) Field of Classification Search
USPC .............. 726/1–4, 6–7, 22, 26; 713/150, 164, 713/167, 189; 709/203, 229
See application file for complete search history.

(56) References Cited

U.S. PATENT DOCUMENTS

| | | | |
|---|---|---|---|
| 7,426,644 B1 | 9/2008 | Strongin et al. | |
| 2006/0190696 A1 | 8/2006 | Ito et al. | |
| 2009/0138937 A1* | 5/2009 | Erlingsson et al. | 726/1 |
| 2009/0222816 A1 | 9/2009 | Mansell et al. | |
| 2011/0202740 A1 | 8/2011 | Grisenthwaite | |
| 2013/0151846 A1* | 6/2013 | Baumann et al. | 713/156 |
| 2014/0283098 A1* | 9/2014 | Phegade et al. | 726/26 |

OTHER PUBLICATIONS

International Search Report and Written Opinion received for PCT Patent Application No. PCT/US2014/019791, mailed on Apr. 30, 2014, 13 pages.

* cited by examiner

*Primary Examiner* — Venkat Perungavoor
*Assistant Examiner* — Amir Mehrmanesh
(74) *Attorney, Agent, or Firm* — Law Office of R. Alan Burnett, P.S.

(57) ABSTRACT

Method, apparatus, and system for qualifying CPU transactions with security attributes. Immutable security attributes are generated for transactions initiator by a CPU or processor core that identifying the execution mode of the CPU/core being trusted or untrusted. The transactions may be targeted to an Input/Output (I/O) device or system memory via which a protected asset may be accessed. Policy enforcement logic blocks are implemented at various points in the apparatus or system that allow or deny transactions access to protected assets based on the immutable security attributes generated for the transactions. In one aspect, a multiple-level security scheme is implemented under which a mode register is updated via a first transaction to indicate the CPU/core is operating in a trusted execution mode, and security attributes are generated for a second transaction using execution mode indicia in the mode register to verify the transaction is from a trusted initiator.

21 Claims, 12 Drawing Sheets

METHOD, APPARATUS, SYSTEM FOR QUALIFYING CPU TRANSACTIONS WITH SECURITY ATTRIBUTES

FIELD

This disclosure pertains to computing systems, and in particular (but not exclusively) to qualifying transactions originating from central processor units and processor cores based on security attributes generated for the transactions.

DETAILED DESCRIPTION

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings.

Historically, computer system architectures employed discrete components such as central processing units (CPU), memory controllers or hubs, Input/Output (I/O) hubs, etc., that were connected via external buses and/or other types of external interconnects. More recently, computer architectures have switched from discrete components to a System on a Chip (SoC) approach, under which various system components are integrated on a single-die or multiple dies integrated on a single substrate, wherein the various components comprise blocks of logic/circuitry (commonly referred to by component name, as functional blocks, and/or Intellectual Property (IP) blocks) interconnected via internal interconnect structures, such as buses, serial-based interconnects, and switch fabrics (also referred to simply as fabrics).

In order to better understand implementations and aspects of embodiments of the invention disclosed herein, the following discussion of a computing system employing a multicore processor is first provided. It will be understood this computing system is merely illustrative of various aspects of computer systems that may be implemented in an SoC or similar architecture, such as a multi-chip module.

Figure 1:
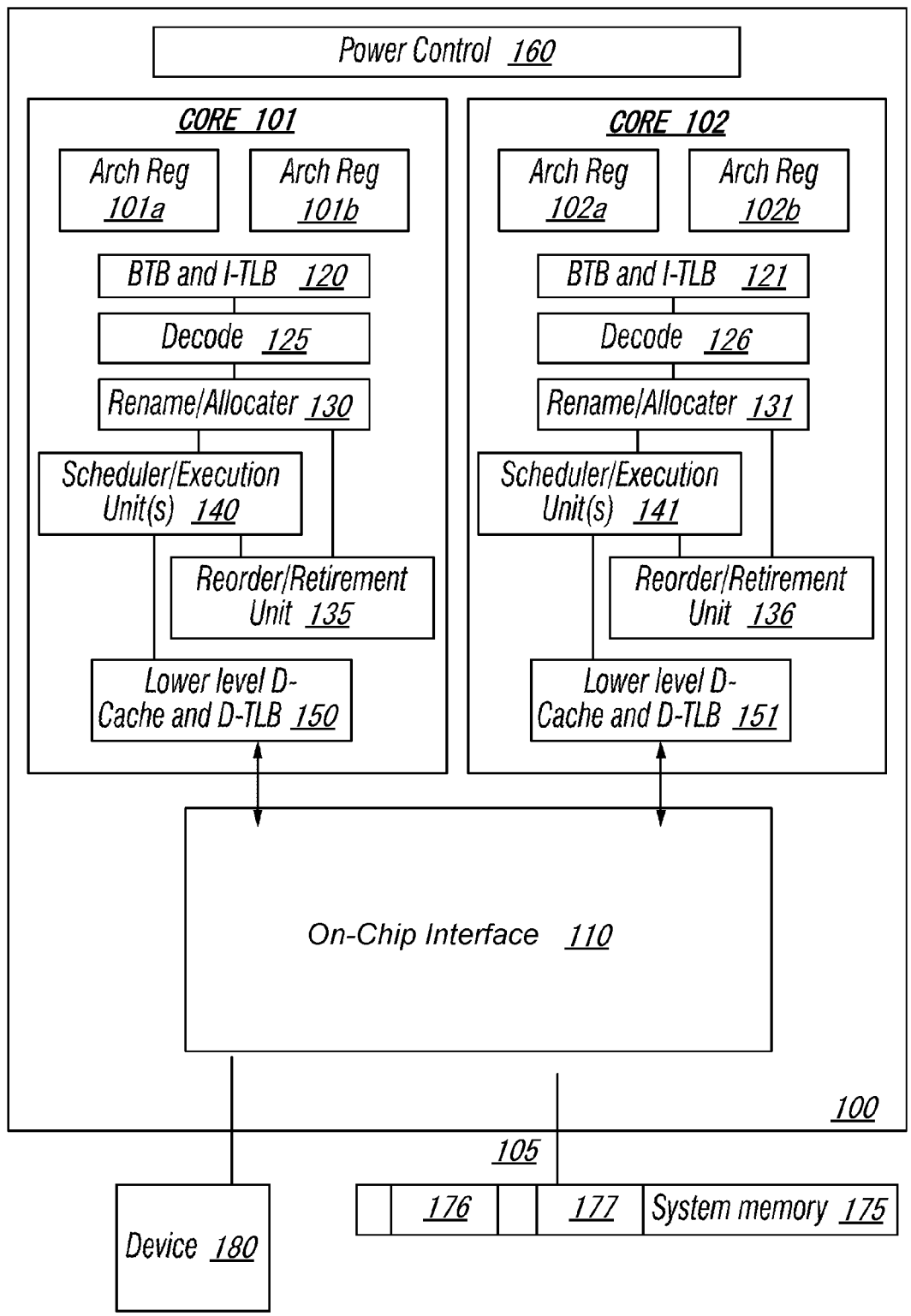
FIG. 1 illustrates an embodiment of a block diagram for a computing system including a multicore processor.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, an SoC, or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 11 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as implemented by an SoC, each of these devices may be incorporated on processor 100. For example, in one embodiment a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, in one embodiment on-chip interface 110 includes a ring interconnect for on-chip communication and a high-speed serial point-to-point link 105 for off-chip communication. Alternatively, on-chip communication may be facilitated by one or more switch fabrics having a mesh-type configuration. Yet, in the SoC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

In a SoC-based platform, processor cores, accelerators and devices access each other's resources to process workloads, including multiple workloads of varying degrees of trustworthiness that may be executing at the same time. In addition, CPU transactions such as microcode and SMM (System Management Mode) require access to critical assets in the SoC such as secure memory regions, configuration controls in the system agent, IP agents etc. Examples of critical assets include Isolated Region of Memory (IMR) dedicated for SMM, configuration registers in the power management controller that are configured by microcode etc. In consideration of this, appropriate controls are needed to protect sensitive assets distributed across the SoC. Otherwise, vendor and customer secrets can be compromised. An example of a threat is one where malware running on computer system tampers with protected memory region registers and exposes secrets.

Future trends suggest that these accelerators may evolve from fixed function to programmable engines that are updated with the latest algorithms. While beneficial, the dynamic software environment could introduce new vulnerabilities. Additionally, memory is distributed throughout the SoC to meet low latency requirements. This increases the number of repositories that store sensitive assets and need restricted access. These factors motivate the need for enforcing access control in a SoC comprised of multiple cores and distributed memory.

Figure 2:
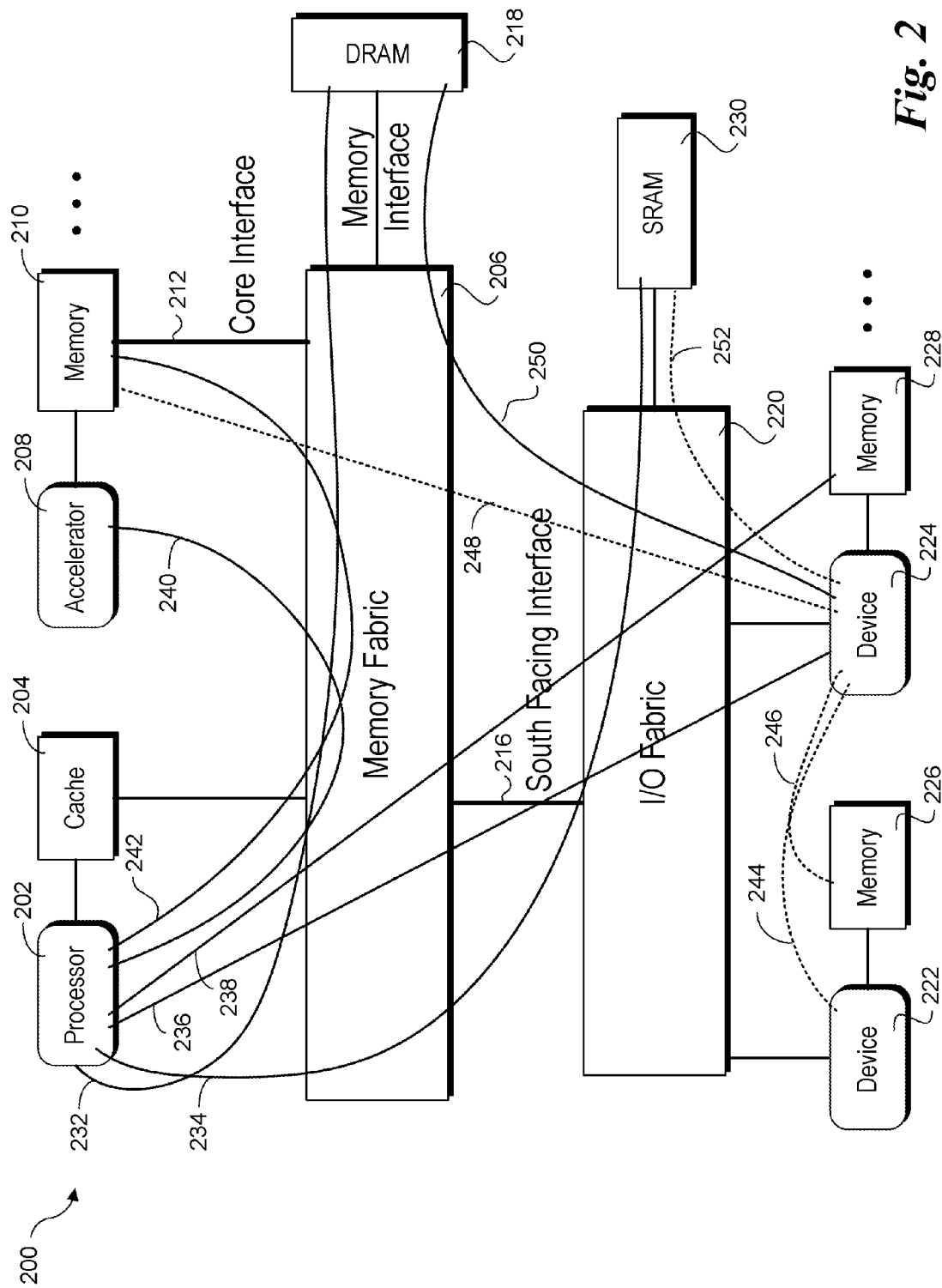
FIG. 2 is a system schematic diagram illustrating an exemplary System on a Chip architecture and corresponding communication paths associated with transactions initiated by devices in the system.

An abstracted architecture corresponding to an exemplary System on a Chip 200 illustrating an exemplary set of processor cores, accelerators, and devices is shown in FIG. 2. SoC 200 includes one or more processor cores 202 (only one or which is shown for simplicity), each including a local cache 204 coupled to a memory fabric 206. SoC 200 also includes one or more accelerators 208 coupled to memory 210, which in turn is coupled to memory fabric 206 via a core interface 212. Memory fabric 206 also includes a memory interface 214 and a south-facing interface 216. Memory interface 214 facilitates communication with dynamic random access memory (DRAM) 218. South-facing interface 216 provides an interconnect between memory fabric and an IO fabric 220. IO fabric 220 supports input/output communications with various IO devices, illustrated by devices 222 and 224, each coupled to respective memory 226 and 228. IO fabric 220 also provides an interface between Static Random Access Memory (SRAM) 230 and the rest of the system components.

During operation of SoC 200, various system components may access SoC assets held or provided by other components/devices. For example, processor 202 may access each of DRAM 218, accelerator 208, memory 210, device 224, memory 228, and SRM 230, as depicted by respective communication paths device 232, 234, 236, 238, 240, and 242. Similarly, various IO devices may access other assets, such as devices and memory resources, as depicted by communication paths 244, 246, 248, 250, and 252.

The processor cores, accelerators, and devices interact with each other to process workloads handled by SoC 200. Interaction is facilitated, in part, by accessing memory and storage resources and/or registers associated with the cores, accelerators and devices, as well as common memory resources such as DRAM 218, SRAM 230, etc. Components that initiate such system resource access requests are referred to herein as "initiators."

As can be seen in the architecture of FIG. 2, some of the initiators, such as processor core 202 and accelerator 208 comprise internal components that are built into SoC 200, while other initiators, such as IO devices 222 and 224, may be internal or external to the SoC, depending on their particular function. Also external to the Soc are software and firmware entities that may attempt to access internal or external resources through internal or external initiators in the SoC. As a result, workloads of varying degrees of trustworthiness may be executing at the same time.

The SoC 200 includes data and hardware assets, such as configuration registers, range registers, etc., that are to be protected against unauthorized access. Under a conventional approach, controlling access to this data and hardware assets is handled in an ad-hoc and fragmentary manner for each SoC by the particular architect of the SoC. This approach does not provide a comprehensive support in the SoC fabrics and interfaces to unambiguously determine the privileges of an initiator.

Recent advances in SoC architectures have introduces memory and IO fabrics that support coherency across both internal (e.g., via memory fabric 206) and external (e.g., via IO fabric 220) memory resources. This is facilitated, in part, through a memory access and coherency framework. In some embodiments, this framework is utilized to define a uniform access control architecture that may be implemented across SoC architectures to support secure access to resources in a consistent manner. In one embodiment, memory fabric 206 and IO fabrics 220 employ Intel® QuickPath Interconnect (QPI) frameworks. In general, each of memory fabric and IO fabric comprise interconnects with corresponding control logic for facilitating transactions between devices and resources connected to the interconnects.

Access Control Model and Architecture

In one embodiment, an attributes-based access control model is implemented to ensure only authorized initiators are permitted access to secured assets. Under the model, a Subject or Initiator accesses an Object or a Target. Properties of the Subject and Object are captured as Subject Attributes and Object Attributes, respectively.

Figure 3A:
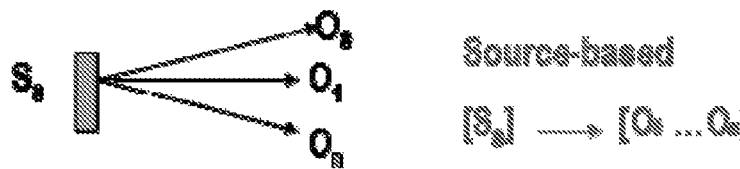
FIGS. 3a and 3b respective show course-grain and fine-grain subject initiator to target object mappings for source-based, target-based and fabric-based SAI enforcement schemes.
Figure 3A:
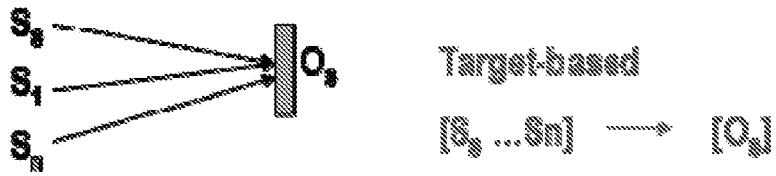
Figure 3A:
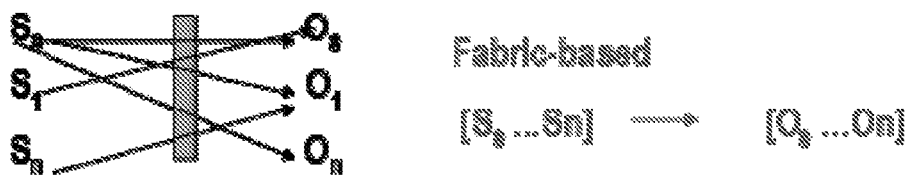

There are multiple points in the SoC platform where the access control policies may be enforced. These enforcement points include at the source (i.e., subject or initiator), target, and/or the fabric. The policies can be either coarse-grained or fine-grained, depending on the type of accesses and other parameters, as respectfully illustrated in FIGS. 3a and 3b.

For source-based access control, access control is enforced at a subject or initiator. In this case, the access policy defines all of the targets that can be accessed by an initiator, as shown by the one-to-many relationship between a source $S_0$ and objects $O_0$, $O_1$, and $O_n$. Additionally, the initiator needs to support decoding target addresses, which adds complexity to the initiator logic. In the case of Target-based access control, the access policy is enforced at the end-point. A target-based access policy accounts for all the initiators that can access the target, as shown in the many-to-one relationship between sources $S_0$ and objects $S_0$, $S_1$, and $S_1$, and a target object $O_0$ for Target-based access control scheme in FIG. 3a. Address decoding is not an issue since the transaction has already made it to the target. This method is commonly employed in the SoCs. Finally, fabric-based access control is independent of the initiator and target and enforces policies in the fabric, typically at an ingress or egress fabric interface. It provides a central point for policy enforcement and hence is easier to manage. Address decoding for targets is done in the fabric. The access control policy defines all the initiators that can access the targets coupled to the fabric, as shown by the many-to-many relationship between sources and target objects in the Fabric-based access control scheme depicted in FIG. 3a.

Figure 3B:
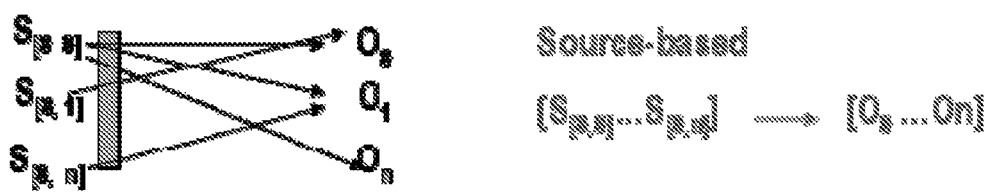
Figure 3B:
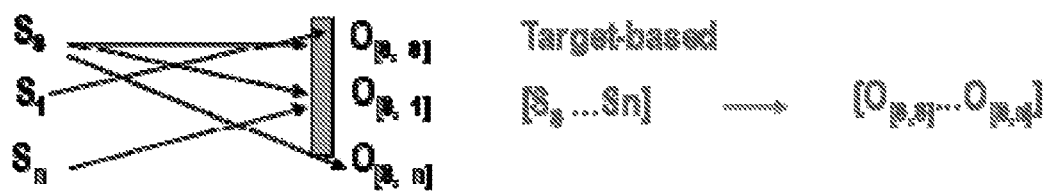
Figure 3B:
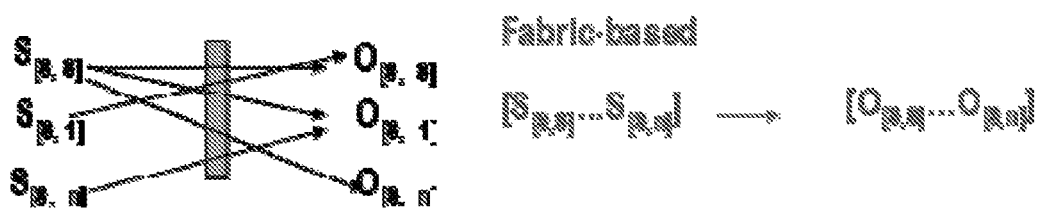

Under the finer grain access control schemes illustrated in FIG. 3b, each source S for the Source- and Fabric-based schemes is depicted as having multiple attributes, such as an identity of an initiator and an operational mode of the initiator. Similarly, for the Target-based fine-grained scheme, a given target object may have multiple access control attributes.

As discussed above, term Security Attributes of Initiator (SAI) is defined to represent the immutable properties of a subject or initiator used for making access decisions. In one embodiment, these attributes are generated by hardware entities and accompany each transaction initiated by a corresponding subject or initiator. Unlike source IDs, SAI do not get transformed at bridges; they persist until the point of policy enforcement. Policy registers are employed for defining the policies for read and write access to an asset and for restricting the entity that can configure or update these policies. In one embodiment, the access control architecture is comprised of the following building blocks: SAI, SAI Generator, SAI Mapper, Read Policy Registers, Write Policy Registers and Control Policy Registers. Additionally, in one embodiment wrappers are used to enforce SAI for external ports to ensure that their accesses are appropriately characterized.

SAI

In one embodiment, security attributes are assigned to subjects/initiators and used to determine the access rights (i.e., read, write, no access, etc.) of the initiators. These Security Attributes of the Initiator or "SAI" represent immutable properties of the initiator used for making access decisions. In one embodiment these security attributes are generated by SoC hardware and accompany every transaction. Unlike source IDs used in some conventional security approaches, SAIs are immutable, meaning they persist until the point of policy enforcement and are not transformed at bridges or interfaces.

In one embodiment, policy registers are defined for each type of access—read and write at a minimum for implementing the access policy. Generally, there are two options for using SAIs with policy registers: 1) the SAI is used to index into read/write policy registers and the value of the policy register indicates access allowed or denied; or 2) the incoming SAI is compared with an expected SAI and access allowed only if the two SAIs match. If there is a situation where there is one or small number of initiators, option 2 may be more optimal. As combination of option 1 and option 2 may also be implemented depending on a specific SoC's access requirements.

In one embodiment, a Control Policy Register is defined that identifies the trusted entity belonging to the Trusted Computing Base protecting the asset that can configure the read and write policies, i.e., the values in the read and write policy registers. The control policy register is self-referential, meaning that its contents are used to enforce access control on accesses to itself.

Figure 4:
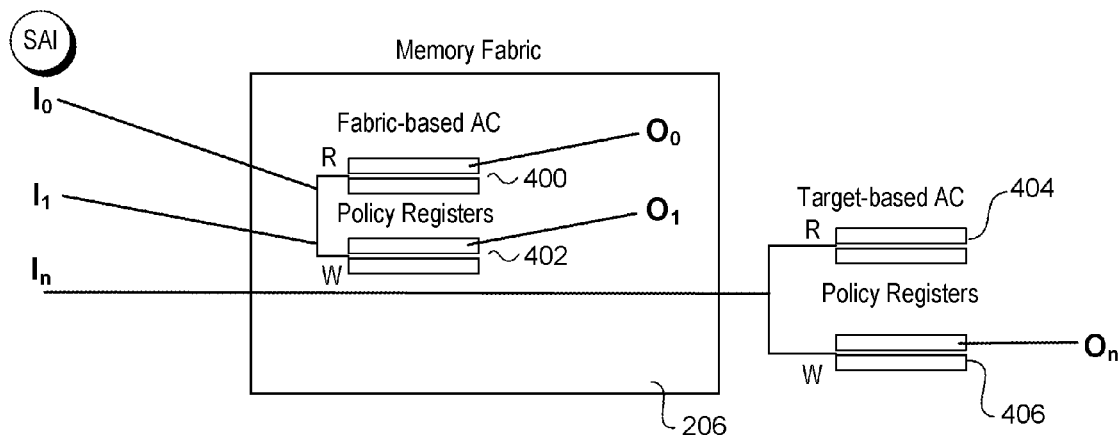
FIG. 4 shows an overview of a secure access mechanism employing policy registers in accordance with one embodiment of the invention.

FIG. 4 shows an overview of an exemplary implementation of an SAI-based security scheme. Under this example, subject initiators $S_0, S_1, \ldots S_n$, are shown accessing target objects $O_0, O_1, \ldots O_n$. Access control for accessing objects that are coupled to a memory fabric 206 (i.e. fabric-based access) is facilitated via memory fabric read and write policy registers 400 and 402. Similarly, access control for accessing external targets (i.e., target-based access), such as IO devices, is facilitated via read and write policy registers 404 and 406.

In the example of FIG. 4, subject $S_0$ desires to perform a read access to a target object $O_0$ (not shown) coupled to memory fabric 206. Each of the subject initiators $S_0, S_1, \ldots S_n$, is assigned a set of security attributes SA, which define the access rights of each initiator as enforced by the SAI security scheme via associated policy registers. Information effecting the set of security attributes SA applicable to a subject is forwarded with each access message initiated by the subject, as described below in further detail. The policy registers store security attributes data for securely controlling access to corresponding objects. If the security attributes of an initiator subject matches the security attributes to access an object, the transaction is allowed to proceed. Conversely, if an initiator subject does not have the proper security attributes (as identified via its SA information forwarded with its access messages), the transaction will be denied, with a corresponding message being returned to the initiator subject.

Security Attributes of Initiator or SAI represents the immutable properties of the initiators (and subjects) which are inspected to determine access to targets in a SoC platform. In one embodiment, these properties include a role, device mode and system mode. The Device mode is dynamic and captures the current internal mode of a device. For example, the mode could be a secure or normal mode. The System mode is dynamic and indicates the mode driven by a processor core. In one embodiment, the processor cores are IA cores, based on Intel 32- or 64-bit architecture (known in the industry as IA). For example, the system mode may be in SMM (System Management Mode) or secure mode, etc. Additionally, for multi-threaded initiators, a context attribute for indicating current thread is defined; these attributes would accompany the SAI.

SAI Generator

An SAI is an encoding that is generated by SoC hardware and is generated by a function whose input parameters may include a Role, Device Mode, System Mode and other optional parameters. The interpretation of an SAI is specific to each SoC, and defined by the SoC architect. As an example implementation, setting a particular bit to '1' in an SAI encoding could indicate an access by a processor core. If the bit is set to '0,' then other bits in the SAI bitmap could be used for encoding device accesses. For example, 100 . . . 1b represents IA core access and 001 . . . 0b represents a device access. Of course, this is merely exemplary, as the number of bits and format of the SAI encoding may be configured by the architect.

SAI Mapper

The I/O devices in some SoCs are connected to non-vendor (i.e., not the vendor of the SoC) or legacy vendor fabrics. For example, some SoCs may incorporate OCP (Open Core Protocol), AMBA (Advanced Microcontroller Bus Architecture), IOSF or other proprietary bus protocols. SAI Mappers are responsible for mapping the security attributes or SAIs that accompany transactions generated by agents in an SoC vendor's standard fabrics to security attributes that can be interpreted in the SoC-specific device domain (e.g., OCP domain). Similarly, for upstream transactions generated by devices in non-vendor fabrics, the security attributes generated by the devices have to be mapped to SAIs that can be interpreted in the memory/coherency and IOSF domains. Typically these mappers may be implemented in the bridges that map one fabric protocol to another. In some embodiment, these mappers are securely mapped in hardware and cannot be manipulated.

Figure 5:
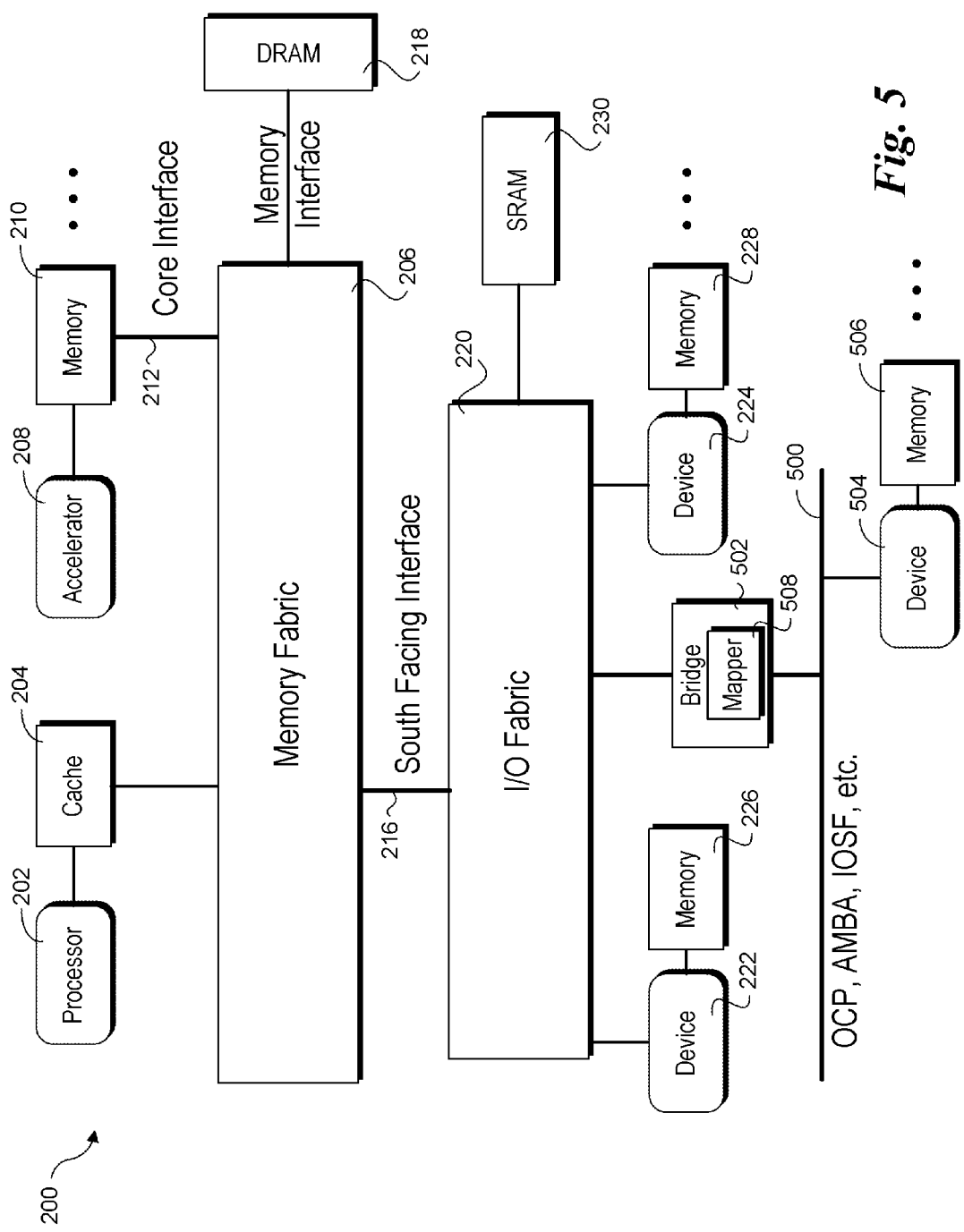
FIG. 5 shows the SoC of FIG. 2, further including a bus implementing a proprietary protocol and a mapper for mapping security attributes between the proprietary protocol and a protocol employed by the SoC fabrics.

An exemplary implementation of an SAI mapper is shown in FIG. 5. In this example, a vendor, non-vendor or legacy vendor bus or switch fabric 500 that is different that IO fabric 220, such as an OCP, AMBA, IOSF etc. is coupled to IO fabric 220 via a bridge 502. One or more devices 504 with memory 506 is coupled to bus 500, wherein access to these devices is in accordance with the protocol implemented by bus 502. Meanwhile, a different protocol is implemented for transactions to access assets and resources connected to memory fabric 206 and IO fabric 220 in SoC 200. To facilitate transactions between devices connected to bus 500 and SoC 200, bridge 502 employs an SAI mapper 508 to map SAI data between the two protocols.

Read and Write Policy Registers

Figure 6:
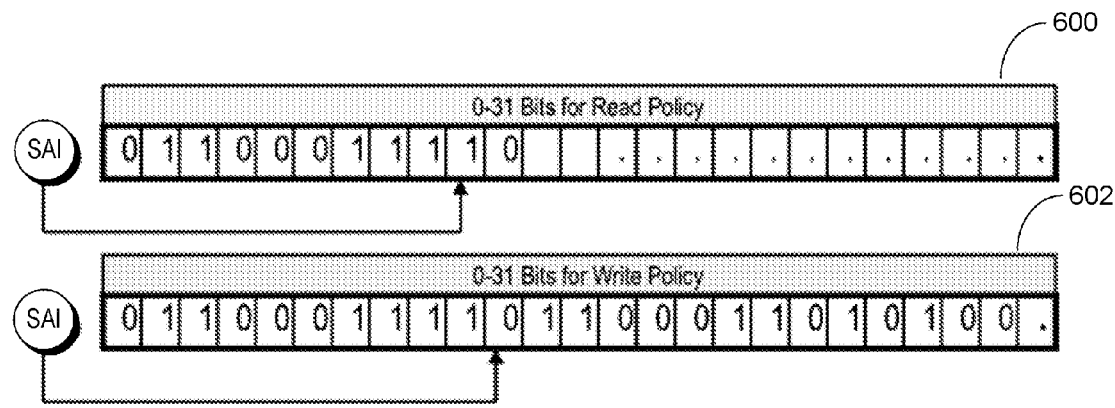
FIG. 6 shows an exemplary set of read and write policy registers in accordance with one embodiment of the invention.

The Read and Write Policy registers contain the read and write permissions that are defined for each initiator by the SoC architect. The SAI accompanying the transaction serves as an index to the policy register. As an example, in one embodiment a 32-bit read and write policy register is defined in the memory fabric. A corresponding pair of read and write policy registers 600 and 602 are shown in FIG. 6, wherein 1's indicate access is allowed and 0's indicate access is denied. In general, the SAI width is n-bits. The value of n may change from one generation to another and/or differ between products. In one embodiment the encoding space is $2^{(n-1)}$, where one of the n bits is used to differentiate core vs. device encodings. Use of a 32-bit register is merely exemplary, as the actual encodings will generally be specific to a product. SAI assignment to an initiator is flexible and depends on the particular product. For example, there could be one SAI per initiator or multiple SAIs per initiator or group multiple initiators into one SAI.

Control Policy Register

Figure 7:
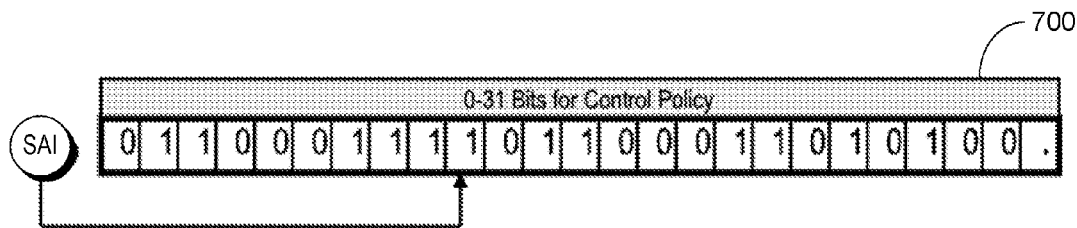
FIG. 7 shows an exemplary control policy register in accordance with one embodiment of the invention.

The contents of the Control Policy Register define the trusted entity that is allowed to configure the Read and Write Policy Registers. The Control Policy Register is a self-referential register; the SAI specified in the Control Policy Register is allowed to modify the read and write register policies as well as overwrite the contents of the Control Policy Register. By allowing a single trusted entity to configure the control policy register, the implication is that access to the policy registers is locked to all other agents. The entity specified by the SAI in the Control Policy Register may choose to extend the set of agents that can configure the Policy Registers beyond the initial value loaded at power-on/reset or the trusted entity may write Os into the control policy register thus locking it until the next system reset/power-on. This provides flexibility for the SoC architect to implement locking down the policy registers until the next reset or allow the policy to be updated by a trusted entity during runtime. An exemplary 32-bit Control Policy Register 700 is shown in FIG. 7.

Figure 8:
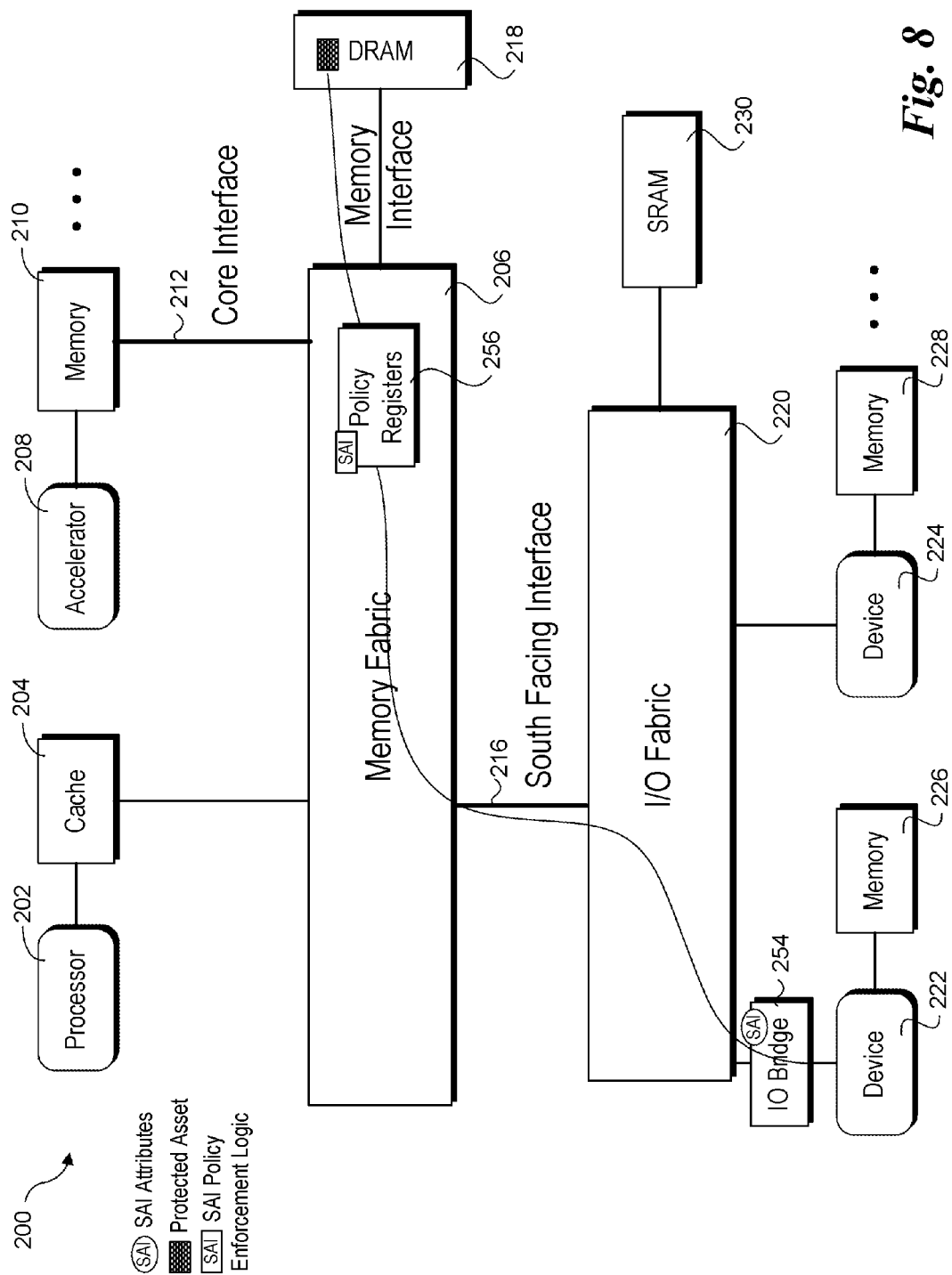
FIG. 8 shows an exemplary transaction and associated secure access enforcement mechanism facilities using the SoC of FIG. 2, according to one embodiment of the invention.

FIG. 8 depicts an example of securely enforcing device accesses to memory. Under this example, device 222 initiates a transaction (e.g., read or write) to access DRAM 218. At an I/O bridge 252, appropriate SAIs are generated via the bridge hardware; these SAI will be forwarded with the transaction message across interfaces until reaching an applicable security enforcement entity, which in this case are policy registers 256 in memory fabric 206. At policy registers 256, the SAI will be inspected and evaluated against the applicable policy register in accordance with the type of transaction, e.g., read or write.

The SAI secure access enforcement scheme disclosed herein provides many advantages over current approaches. It defines uniform access control building blocks such as SAI generators, SAI mappers, policy registers, etc. that can be employed consistently across SoC designs. It applies to SoC fabrics in a uniform manner. These benefits are achieved by associating a persistent attribute, the SAI, with each transaction. By forwarding SAI data within existing formats of transaction messages, support for adding access security measures can be achieved within existing interconnect frameworks, such as QPI. An SoC can use the SAI information to enforce access control on transactions generated by all initiators that target SoC assets such as memory, uncore registers, I/O devices, etc. SAIs can be used to allow exclusive access to memory regions to specific I/O devices or exclusive access to SoC assets when the processor runs in specific modes. The access control architecture is a powerful new paradigm that allows evaluation of all access control decisions within a consistent and modular framework. By carrying the SAI information persistently across interconnects, we simplify design, debug and validation of access control assertions since the initiator security role is immediately available across all micro-architectural structures that buffer transactions.

Figure 9:
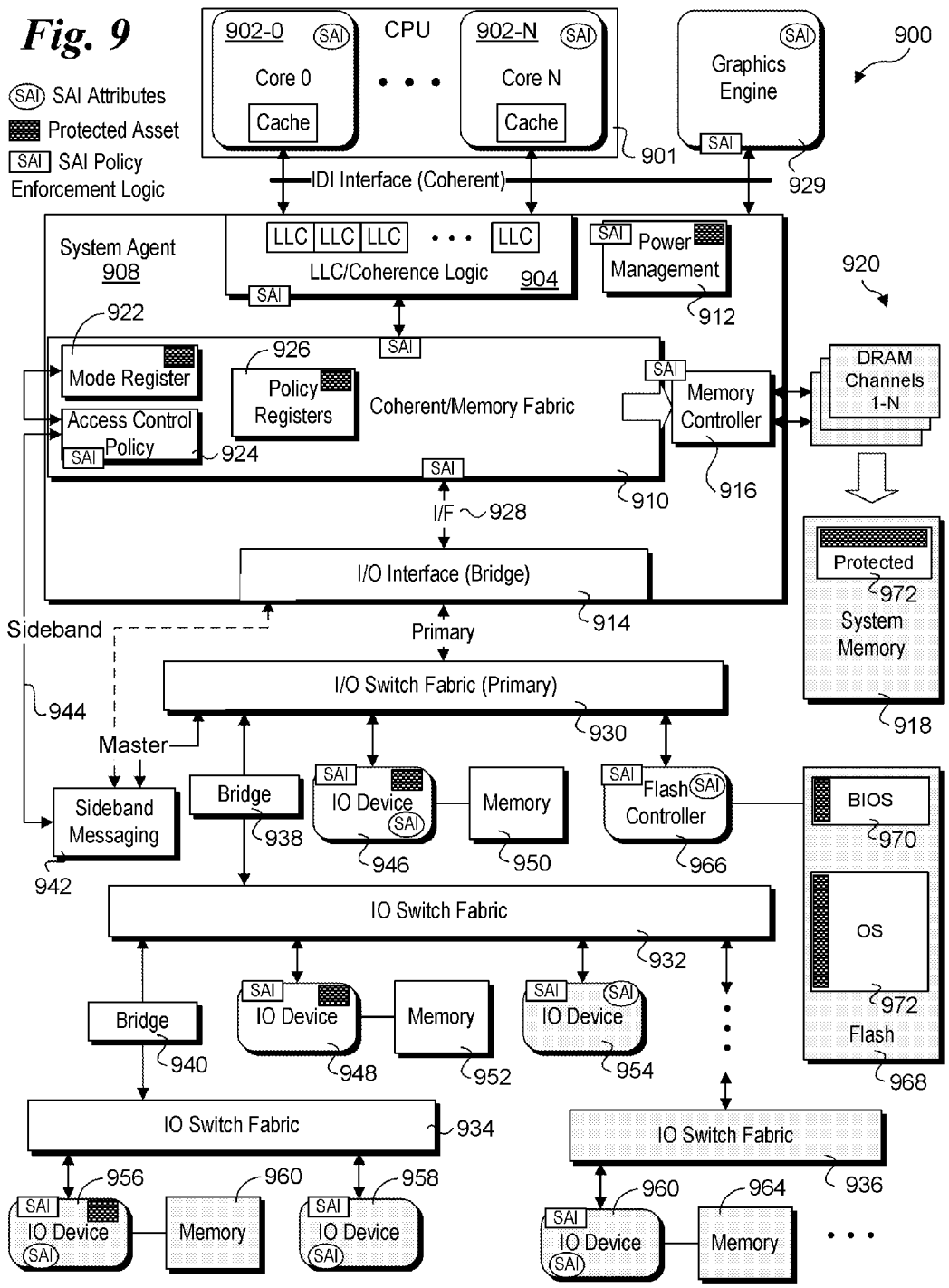
FIG. 9 is a block schematic diagram of an exemplary system architecture in which aspects of the embodiments disclosed herein may be implemented.

FIG. 9 illustrates a system architecture 900 configured to implement and SAI-based access security scheme, according to one embodiment. In system 900, components depicted with white backgrounds are integrated on an SoC, while those shown with a light gray background are off-chip components that are coupled in communication with applicable interfaces on the SoC.

The SoC components comprise a CPU 901 including a plurality of processor cores 902-0-902-N, coupled to a last level cache (LLC) and coherence block 904 in a system agent 906 via a coherent interface, which in one embodiment is an intra-die interconnect (IDI) interface. Each of cores 902 is depicted as including a local cache, which typically may comprise a first level cache (L1 cache) or a combination of a first and second level cache (L1/L2 cache). LLC and Coherence block 904 include a distributed last level cache (LLC), which in the illustrated embodiment is configured as a plurality of LLC slices, with each slice logically allocated to a respective core 902. Logic in LLC and Coherence block 904, in combination with other system logic (not shown) is configured to facilitate memory coherency for memory transactions originating from cores 902-0-902-N. In one embodiment, each of cores 902-0-902-N represents a logical core, and the CPU includes one or more physical cores, each having one or more logical cores. For instance, under Intel's® Hyper-Threading (HT) Technology, each physical core supports implementation of two logical cores.

System agent 908 further includes a coherent/memory fabric 910, a power management block 912, an I/O interface 914, and a memory controller 916. Coherent/memory fabric 910 comprises a memory fabric with support for coherent memory transactions and non-coherent memory transactions, and is depicted as interfacing with memory controller 916, which is configured to facilitate access to off-chip system memory 918 comprising DRAM 920 accessed via multiple DRAM channels. In one embodiment, coherent/memory fabric 910 employs an Intel® QPI interconnect structure and protocol. In another embodiment, coherent/memory fabric 910 employs an Intel® Keizer Technology Interconnect (KTI) interconnect structure and protocol. Coherent/memory fabric 910 is further depicted as logically including a mode register 922, access control policy logic 924 and policy registers 926. As used herein, "logically including" means the corresponding component is related to the operation of the block in which it is depicted, but may be implemented as a separate block in an actual implementation. In one embodiment, coherent/memory fabric 910 is coupled to I/O interface 914 via an internal interconnect interface 928.

System architecture 910 also includes a graphics engine 929 that is depicted as being coupled to system agent 908. In one embodiment graphics engine 929 is connected to the IDI interface or another interconnect (not shown) to one or more of processor cores 902-0-902-N to directly access graphics engine 929.

I/O interface 914 is configured to operate as a bridge between system agent 908 and an I/O subsystem depicted towards the bottom half of FIG. 9 and including an I/O interconnect hierarchy including multiple I/O switch fabrics. At the top of the I/O interconnect hierarchy is a primary I/O switch fabric 930 that is connected to I/O interface 914 via a primary interface. The other I/O switch fabrics in the I/O interconnect hierarchy include on-chip I/O switch fabrics 932 and 934, and an off-chip I/O switch fabric 936. Generally, I/O switch fabrics 930, 932, 934, and 936 may be implemented using various interconnect structures and related protocols, including but not limited to IOSF, OCP, AMBA, or other existing or future switch fabric. In instances where two I/O switch fabrics implement different protocols, bridges are implemented to interface between the different protocols, as depicted by bridges 938 and 940. In addition, I/O switch fabrics that are coupled in communication and employ different clock frequencies may include an interface having appropriate clock-crossing domain circuitry for facilitating communications between the two fabrics.

System architecture 900 also includes a sideband messaging block 942 that is coupled to I/O interface 914 and/or primary I/O switch fabric 930 via a master interface. Sideband messaging block 942 is coupled to access control policy logic via a sideband channel 944, which is also referred to as a messaging channel. Generally, sideband and/or messaging channels are used for facilitating configuration operations and are not used for transmitting data payloads in connection with data transactions.

FIG. 9 further depicts various I/O devices and associated memories that are coupled to the illustrated I/O switch fabrics at various levels in the I/O interconnect hierarchy, including on-chip I/O devices 946 and 948 respective coupled to memories 950 and 952, and off-chip I/O devices 954, 956, 958, and 960, and off-chip memories 962 and 964. Additionally, an I/O device comprising a flash memory controller 966 is coupled to primary I/O switch fabric 930 and is configured to facilitate access to flash memory 968 in which system firmware comprising BIOS 970 is stored. In one embodiment, flash memory 968 is also used to store an operating system 972. Optionally, the operating system may be stored on a separate storage device, such as a disk drive or solid-state drive (both not shown).

As discussed above, SAIs may be generated at various subject initiators, and SAI policy enforcement logic may be implemented at various components in a system. With reference to the legend depicted at the upper-left corner of FIG. 9, components that are configured to generate SAIs are depicted with an oval labeled "SAI," while locations for SAI policy enforcement logic is depicted by boxes labeled "SAI." In addition, protected assets are depicted with a cross-hatch box, as shown in the legend. It will be understood that the depiction of SAIs, SAI policy enforcement logic, and protected assets in system architecture 900 is merely exemplary, and that in an actual SoC different configurations are likely to implemented.

Figure 10:
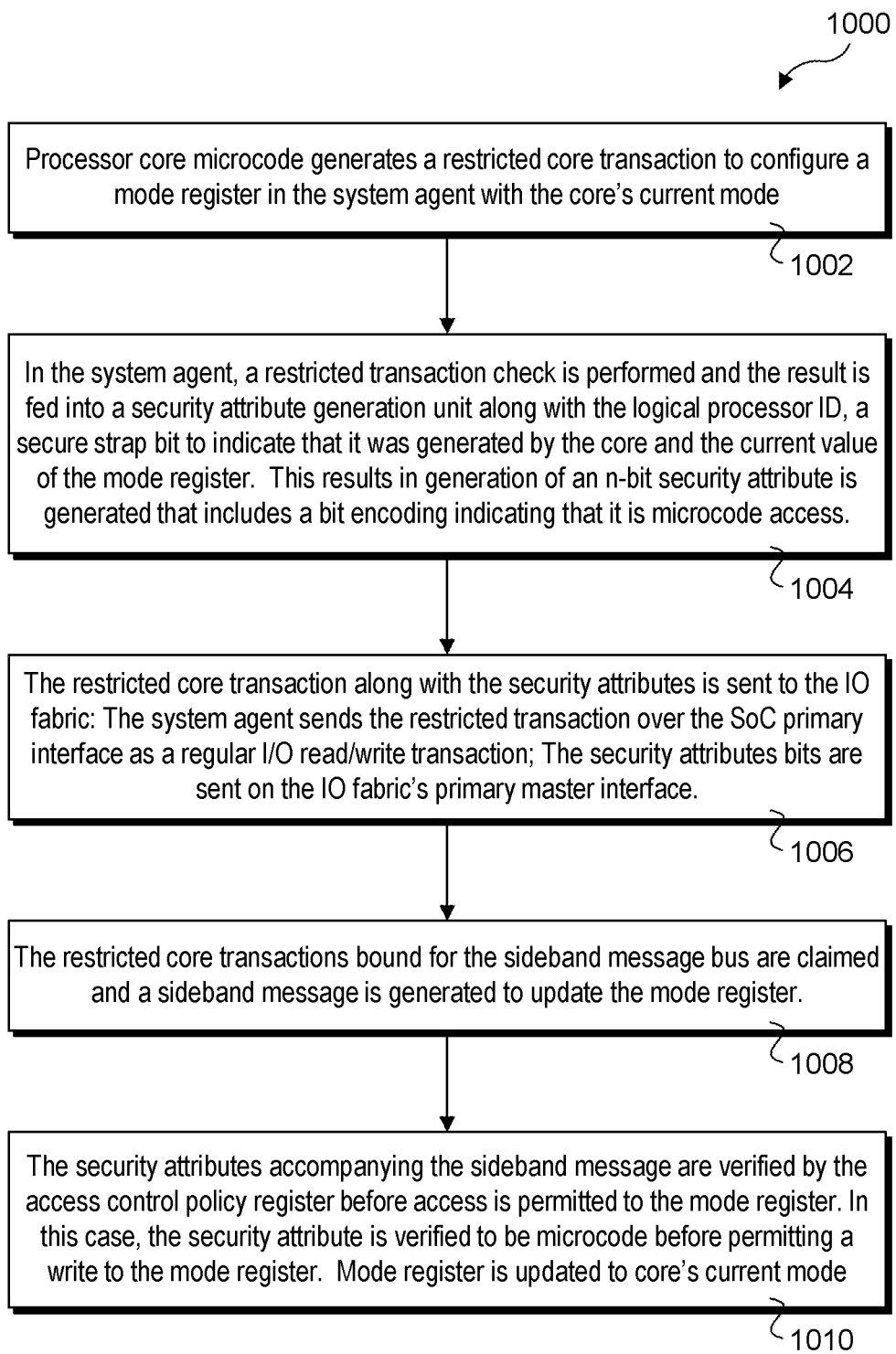
FIG. 10 is a flowchart illustrating operation performed to update a mode register with indicia indicating a current execution mode of an initiator, according to one embodiment.

As illustrated in FIG. 9, SAI policy enforcement is implemented via SAI policy enforcement logic blocks at endpoints and within various fabrics and interfaces. As discussed above, SAI policy enforcement may also be implemented at subject initiators (not shown). Generally, an SAI enforcement logic for fabrics may be implemented at ingress or egress interfaces to the fabric, and/or logic blocks within or logically associated with the fabric. Depending on the type of I/O device, SAI enforcement logic may be implemented in an I/O device (or its interface or associated agent), or a wrapper may be employed, as discussed above and in further detail below with reference to FIGS. 10a and 10b. Protected assets may generally include hardware-based assets, such as registers, or portions of protected memory within memory associated with an I/O device or other system component, such as depicted by protected memory 972 in system memory 918.

Qualifying CPU Transactions with Security Attributes

Historically, central processing units included a single core and were implemented as separate components in a multichip system architecture. As discussed above, more recent system designs typically implement a processor or SoC architecture including a plurality of processor cores. Due to the foregoing historical context, transactions originating from processor cores are referred to herein as CPU transactions, or alternatively, processor core transactions.

As discussed above, CPU's and their processor cores are used to execute instructions to perform associated operations. The most common type of instructions is machine code corresponding to modules and applications that are compiled to support the instruction architecture of the CPU/processor core. These modules and applications include the operating system kernel, applications that are hosted by the operating system, and device drivers.

For security reasons, modern CPUs and processor cores are configured to facilitate execution of instructions at different privilege levels. The lowest privilege level is used for execution of application code, which is the least trustworthy and provides for the most common source for malicious code. The most trusted code is processor microcode, which is hardware-based and cannot be accessed via application software. Other trusted code includes System Management code that is executed while in SMM; this code is only permitted to be located at certain predetermined locations that are accessible when in SMM.

As discussed above, SAIs may include attributes identifying a system mode when the initiator is a CPU or processor core. In order to prevent a malicious entity from generating an SAI indicating the initiator is a processor core running in a secure mode, under one embodiment a multiple-level security scheme is implemented for transactions originating from CPUs/processor cores.

The multiple-level security scheme employs two phases—an execution mode configuration phase and an ongoing transaction phase while in that execution mode. With reference to flowchart 1000 in FIG. 10, the execution mode configuration phase is implemented as follows, according to one embodiment.

The process begins in a block 1002, wherein a processor core generates a restricted core transaction to configure a mode register in the system agent with the core's current mode. In the system agent, a restricted transaction check is performed and the result is fed into a security attribute generation unit along with the logical processor identifier (LPID), a secure strap bit to indicate that it was generated by the core, and the current value of the mode register (which comprises indicia indicating a corresponding execution mode), as depicted in a block 1004. This results in generation of an n-bit security attribute that includes a bit encoding indicating that it is microcode access.

In a block 1006, the restricted core transaction along with the security attributes is sent to the IO fabric. The system agent sends the restricted transaction over the SoC primary interface as a regular I/O read/write transaction. During a parallel operation, the security attributes bits are sent on the IO fabric's primary master interface. In a block 1008 the restricted core transactions bound for the sideband message bus are claimed and a sideband message is generated. The security attributes accompanying the sideband message are verified by the access control policy register before access is permitted to the mode register, as depicted in a block 1010. In this case, a security attribute indicating an execution mode of the transaction initiator is verified to correspond to a microcode execution mode before permitting a write to the mode register. The mode register is then updated to core's current mode.

Once the mode register is updated with the core's current mode, any transactions generated by the core will be accompanied with those security attributes. These security attributes, which are immutable, accompany the transaction over SoC fabrics and interconnects unmodified. At the target, these attributes are inspected by policy enforcement logic that determines whether to permit or deny access to the asset. As a result, transactions initiated by CPUs when operating in certain trusted execution modes, such as CPU microcode transactions or SMM transactions can be treated with special privileges when accessing system resources such as DRAM, SRAM, configuration registers, MMIO, fuses etc.

Figure 11A:
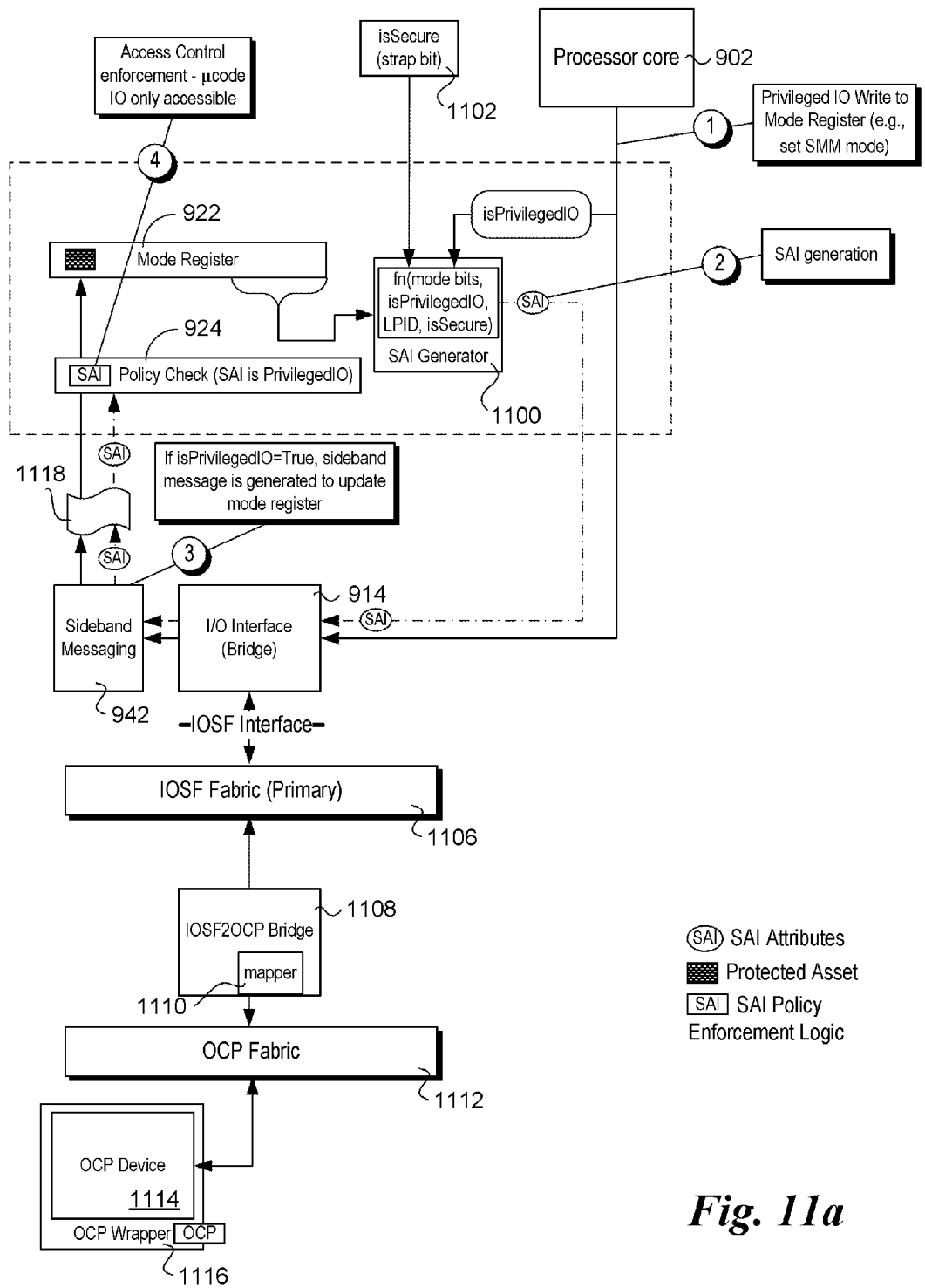
FIG. 11a is a combination architecture and dataflow diagram illustrating Further a mode register update process, according to one embodiment.
Figure 11B:
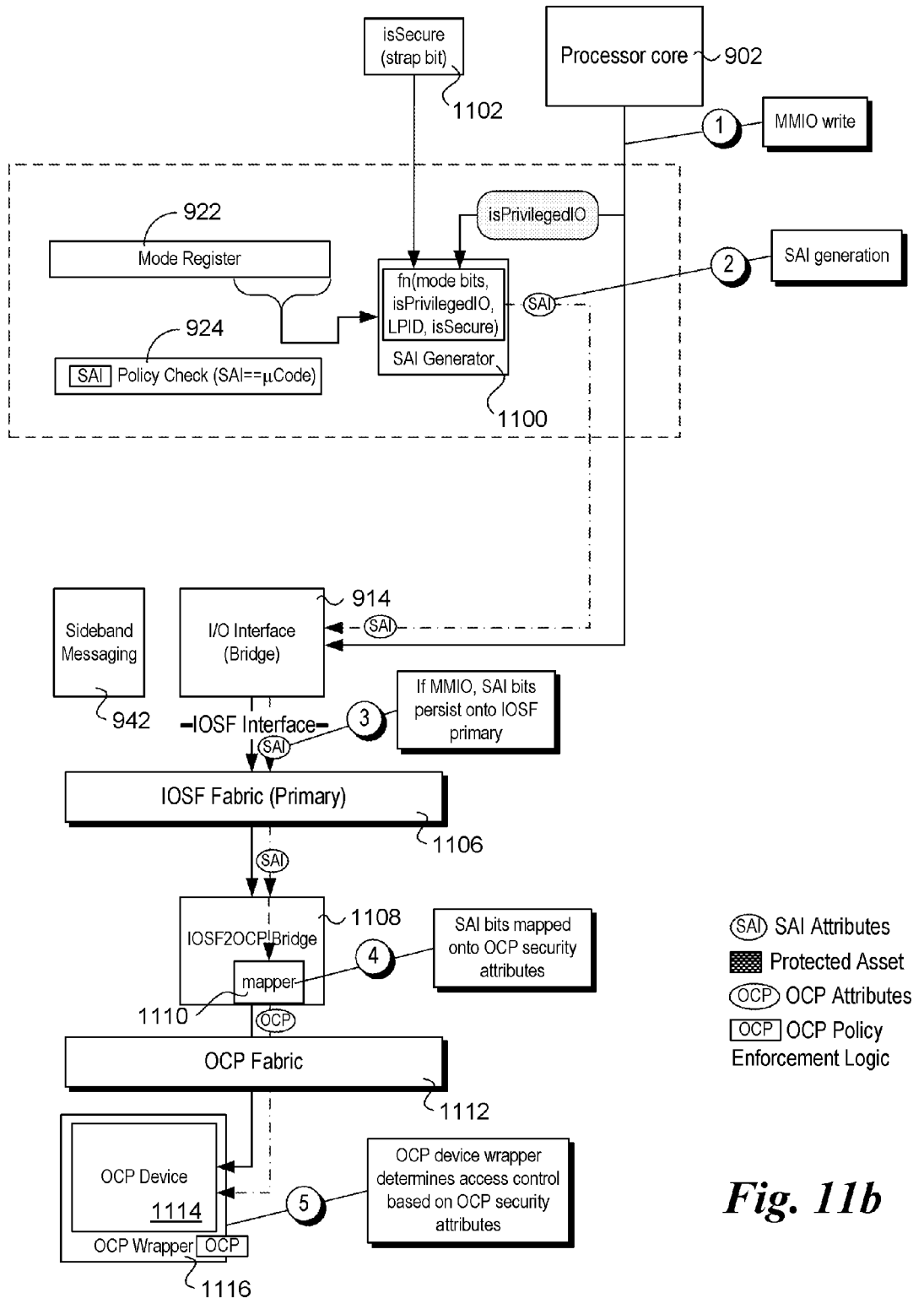
FIG. 11b is a combination architecture and dataflow diagram illustrating a MMIO write transaction, according to one embodiment.

Further details of the mode register update process followed by a MMIO write transaction, according to one embodiment, are depicted in FIGS. 11a and 11b, each of which depicts a combination architecture and dataflow diagram. Generally, the system components in FIGS. 11a and 11b are illustrative of an exemplary implementation corresponding to selected components of system architecture 900 of FIG. 9. In addition to components in FIGS. 9, 11a, and 11b that share common reference numbers (and thus are configured similarly), the illustrated components in FIGS. 11a and 11b include an SAI generation unit 1100, an IOSF fabric 1106, an IOSF2OCP Bridge 1108 including a map 1110, an OCP fabric 1112, an OCP device 1114, and an OCP device wrapper 1116. In each of FIGS. 11a and 11b, boxes adjacent to encircled numbers depict corresponding operations and/or a current state of transaction data.

The mode register update process begins with processor core 902 operating in a trusted execution mode and generating a transaction comprising a microcode write to mode register 922 to set indicia in the mode register identifying the core is operating in microcode mode. The microcode write transaction comprises a privileged transaction, which, in one embodiment, is identified as a privileged transaction by having an I/O address above a predetermined threshold or otherwise within a predefined address range. Next, in memory fabric 910, a Privileged I/O check is performed and the result is fed in to SAI generation unit 1100 along with the logical processor ID for core 902, a secure strap bit 1102 to indicate if it was generated by a processor core, and the current value of the mode register. Thus, the SAI is encoded as the function, $$SAI=Fn(isPriviledgedIO, LPID, IsSecure, Mode Register Value)$$

In response to these inputs, logic in SAI generation unit 1100 outputs an n-bit SAI.

The microcode write transaction including the SAI is forwarded to I/O interface 914 via applicable interconnects and interfaces (not shown). The I/O interface sends the microcode I/O transaction over the IOSF primary interface to IOSF fabric 1106 as a regular I/O read/write transaction. Meanwhile, the SAI bits are sent as command attributes on the IOSF primary master interface to sideband messaging block 942. In one embodiment, the sideband messaging block claims transactions in one or more predefined address ranges as microcode IO transactions bound for the sideband message bus. Once the transaction is claimed, sideband messaging block 942 generates a sideband message 1118 that is sent to mode register 922. The SAI accompanying sideband message 1106 is verified by SAI policy check logic in access control policy block 924, before access is permitted to mode register 922. In this case, the SAI is inspected by the Write Policy Register to verify it is a microcode transaction. Once the SAI is verified, mode register 924 is updated with the processor core 902's current execution mode (i.e., updated to microcode mode in this example).

Once the current execution mode indicia in the mode register has been changed, subsequent transactions originating from processor core 902 will include an SAI that is encoded to indicate the processor execution mode is the mode identified by the indicia (e.g., microcode) until the execution mode indicia in the mode register is updated in connection with a change to a different execution mode. By using this multi-level security scheme (i.e., requiring the mode register to first be updated separate and apart from the subsequent transactions), a malicious agent is preventing from accessing protected assets by simply masquerading as a processor core.

FIG. 11b illustrates operations and dataflows for a subsequent MMIO transaction while the CPU is operating in SMM. The process begins with processor core 902 generating a MMIO transaction at operation 1. As before, an n-bit SAI is generated at operation 2 based on the values of the parameters passed to the SAI generation function—Fn(isPrivilegedIO, LPID, IsSecure, Mode Register Value). The MMIO transaction (which now includes the SAI) is forwarded to I/O interface 914 via applicable interconnects and interfaces. As depicted at operation 3, the I/O interface then sends the MMIO transaction along with its SAI over the IOSF primary master interface of IOSF fabric 1108 as regular I/O transaction. In the case of an MMIO targeted at an OCP device (e.g., OCP device 1114 in this example), IOSF2OCP bridge 1108 claims the transaction. The SAI is sent as command attributes over the primary master interface. The SAI is mapped by map 1110 in IOSF2OCP bridge 1108 to OCP security attributes that are interpretable by OCP fabric 1112 and OCP devices coupled thereto, as depicted at operation 4. In one embodiment, the OCP security attributes adhere to the same restrictions as SAI. At operation 5, OCP device wrapper 1116 determines whether access should be granted based on the OCP security attributes. In one embodiment, OCP device wrapper 1106 comprises Read/Write policy registers that are configured to inspect the OCP security attributes accompanying the MMIO transaction and, based on its policy, denies or permits access to the OCP device 1114.

In addition to facilitating access to protected assets from CPU initiators operating in a trusted execution mode, support for different levels of trust may be implemented for CPUs that support operation in multiple trusted execution modes. For example, suppose a CPU supports the following execution modes:

T0 (Trusted level 0, e.g., Microcode)
T1 (Trusted level 1)
T2 (Trusted level 2, e.g., Boot BIOS)
T3 (Trusted level 3, e.g., SMM)
. . .
U0 (Untrusted level 0)
U1 (Untrusted level 1)
. . .

Under this and similar configurations, the SAI generation unit logic and the SAI policy enforcement logic may be configured to enforce access policies based on different levels of trust. For example, some protected assets may only be accessed from an initiator executing in microcode mode, while other protected assets might be accessed from an initiator executing in an SMM mode or higher level trusted execution mode.

In some embodiments, CPU execution modes may be nested. For example, BIOS code may get a System Management Interrupt (SMI) shortly after it begins to boot a system, while an SMM handler may include a microcode routine to interact with the resources and assets in an SoC. Under different options, once the mode register has been updated to reflect a trusted execution mode, the mode register may or may not be updated with each change in trusted execution mode level. However, in one embodiment, whenever changing between trusted and untrusted execution modes, the execution mode indicia in the mode register will be updated.

The SAI secure access enforcement scheme disclosed herein provides many advantages over current approaches. It defines uniform access control building blocks such as SAI generators, SAI mappers, policy registers, etc. that can be employed consistently across SoC designs. It applies to SoC fabrics in a uniform manner. These benefits are achieved by associating a persistent attribute, the SAI, with each transaction. By forwarding SAI data within existing formats of transaction messages, support for adding access security measures can be achieved within existing interconnect frameworks, such as QPI. An SoC can use the SAI information to enforce access control on transactions generated by all initiators that target SoC assets such as memory, uncore registers, I/O devices, etc. SAIs can be used to allow exclusive access to memory regions to specific I/O devices or exclusive access to SoC assets when the processor runs in specific modes. The access control architecture is a powerful new paradigm that allows evaluation of all access control decisions within a consistent and modular framework. By carrying the SAI information persistently across interconnects, we simplify design, debug and validation of access control assertions since the initiator security role is immediately available across all micro-architectural structures that buffer transactions.

By generating SAI for transactions initiated within a CPU at a point external to the CPU in combination with indicia indicating the execution mode when the transaction was initiated is a trusted mode, a malicious software-based entity is precluded from masquerading as a trusted initiator. Moreover, another layer of security is added when implementing the multi-level secure transaction scheme that employs a separate transaction for setting the execution mode indicia in the mode register prior to subsequent transactions targeting protected assets.

Figure 12:
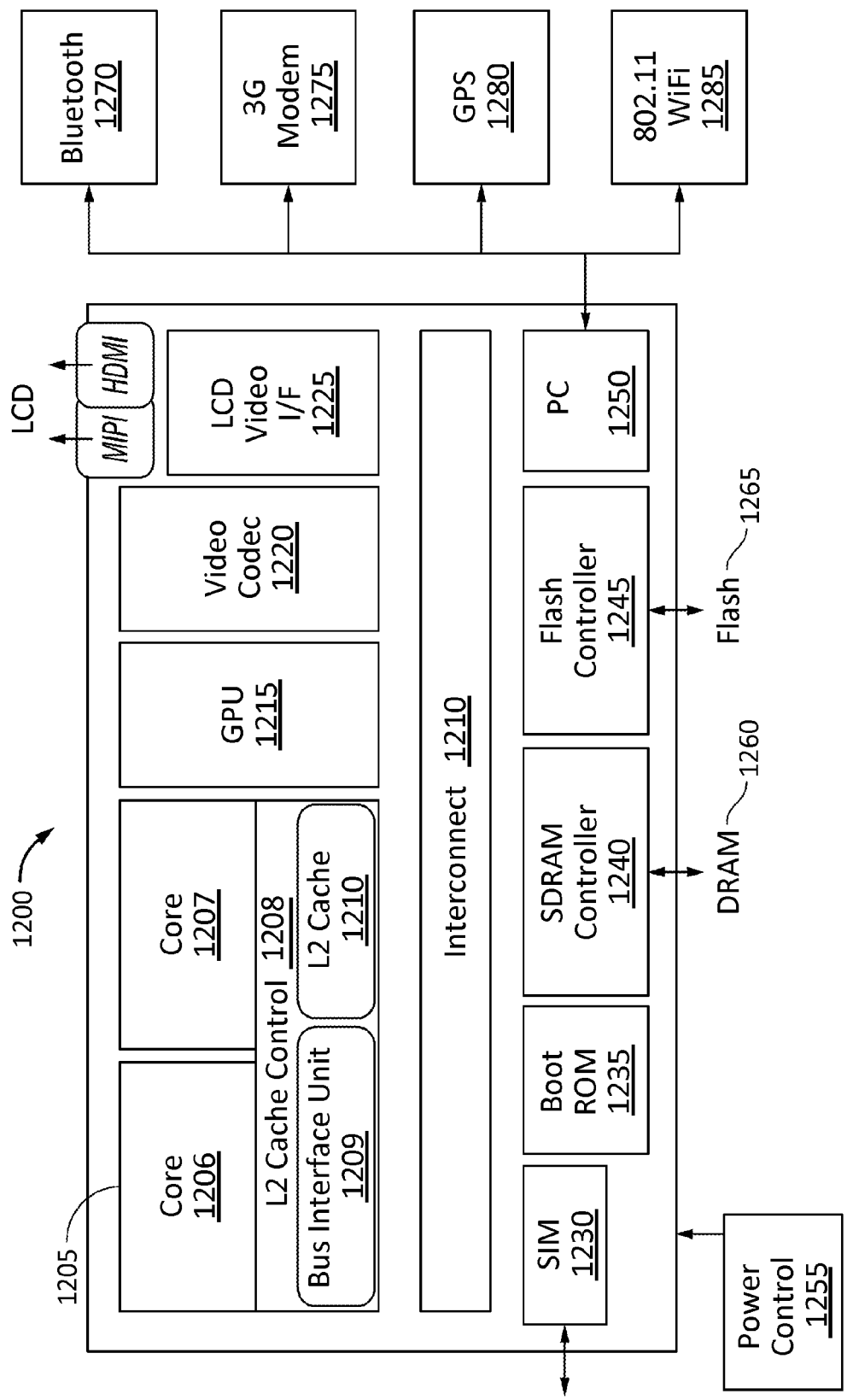
FIG. 12 illustrates an embodiment of a computing system on a chip.

Turning next to FIG. 12, an embodiment of a system on-chip (SOC) design in accordance with the inventions is depicted. As a specific illustrative example, SOC 1200 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1200 includes 2 cores—1206 and 1207. Similar to the discussion above, cores 1206 and 1207 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1206 and 1207 are coupled to cache control 1208 that is associated with bus interface unit 1209 and L2 cache 1210 to communicate with other parts of system 1200. Interconnect 1210 includes an on-chip interconnect, such as an IOSF, AMBA, or other interconnect discussed above, which potentially implements one or more aspects of the described invention.

Interface 1210 provides communication channels to the other components, such as a Subscriber Identity Module (SIM) 1230 to interface with a SIM card, a boot rom 1235 to hold boot code for execution by cores 1206 and 1207 to initialize and boot SOC 1200, a SDRAM controller 1240 to interface with external memory (e.g. DRAM 1260), a flash controller 1245 to interface with non-volatile memory (e.g. Flash 1265), a peripheral control 1250 (e.g. Serial Peripheral Interface) to interface with peripherals, video codecs 1220 and Video interface 1225 to display and receive input (e.g. touch enabled input), GPU 1215 to perform graphics related computations, etc. Any of these interfaces may incorporate aspects of the invention described herein.

In addition, the system illustrates peripherals for communication, such as a Bluetooth module 1270, 3G modem 1275, GPS 1280, and WiFi 1285. Note as stated above, a UE includes a radio for communication. As a result, these peripheral communication modules are not all required. However, in a UE some form a radio for external communication is to be included.

Note that the apparatus', methods', and systems described above may be implemented in any electronic device or system as aforementioned. As specific illustrations, the figures below provide exemplary systems for utilizing the invention as described herein. As the systems below are described in more detail, a number of different interconnects are disclosed, described, and revisited from the discussion above. And as is readily apparent, the advances described above may be applied to any of those interconnects, fabrics, or architectures.

Figure 13:
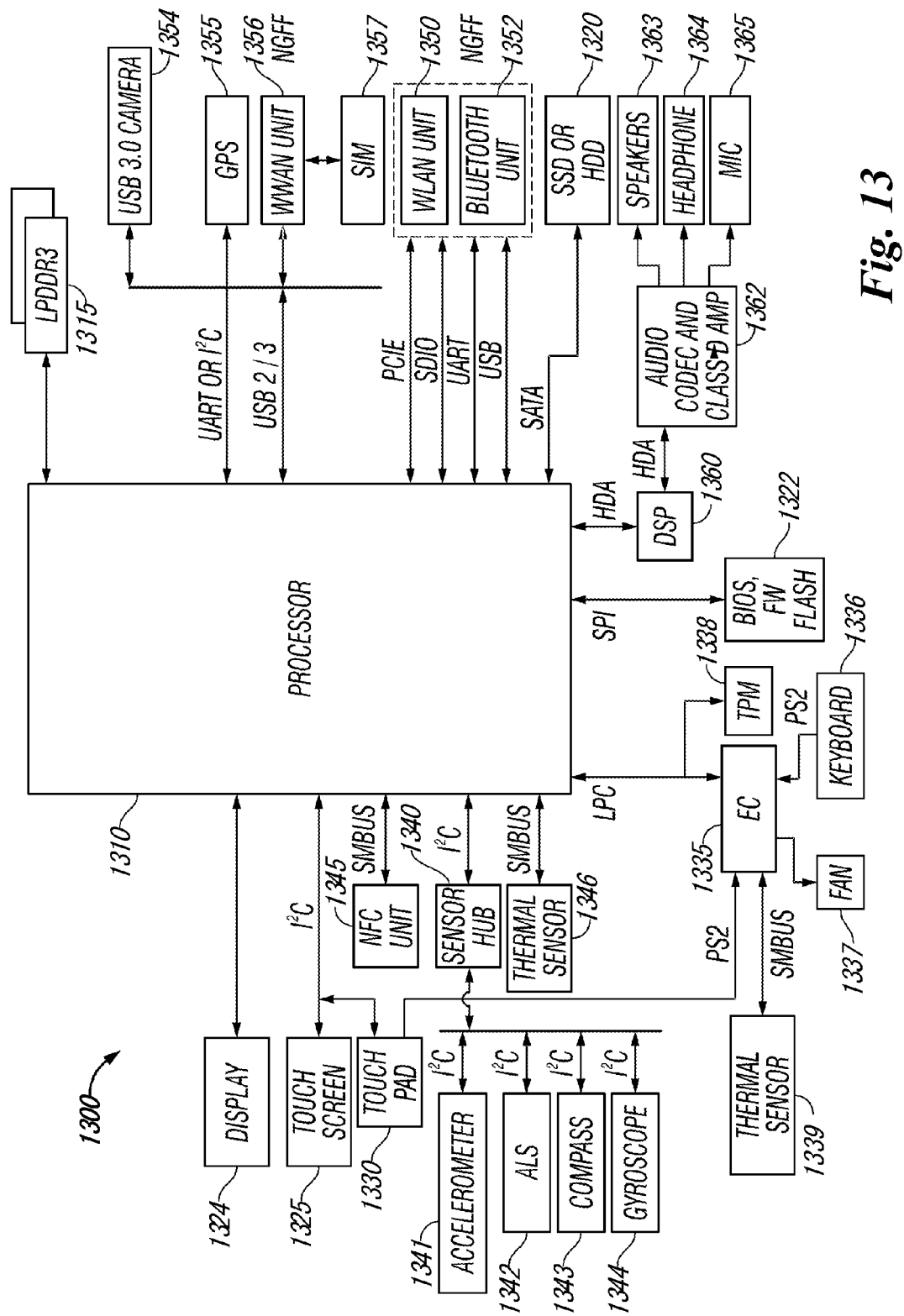
FIG. 13 illustrates an embodiment of a block diagram for a computing system.

Referring now to FIG. 13, a block diagram of components present in a computer system in accordance with an embodiment of the present invention is illustrated. As shown in FIG. 13, system 1300 includes any combination of components. These components may be implemented as ICs, portions thereof, discrete electronic devices, or other modules, logic, hardware, software, firmware, or a combination thereof adapted in a computer system, or as components otherwise incorporated within a chassis of the computer system. Note also that the block diagram of FIG. 13 is intended to show a high level view of many components of the computer system. However, it is to be understood that some of the components shown may be omitted, additional components may be present, and different arrangement of the components shown may occur in other implementations. As a result, the invention described above may be implemented in any portion of one or more of the interconnects illustrated or described below.

As seen in FIG. 13, a processor 1310, in one embodiment, includes a microprocessor, multi-core processor, multi-threaded processor, an ultra low voltage processor, an embedded processor, or other known processing element. In the illustrated implementation, processor 1310 acts as a main processing unit and central hub for communication with many of the various components of the system 1300. As one example, processor 1300 is implemented as a system on a chip (SoC). As a specific illustrative example, processor 1310 includes an Intel® Architecture Core™-based processor such as an i3, i5, i7 or another such processor available from Intel Corporation, Santa Clara, Calif. However, understand that other low power processors such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters may instead be present in other embodiments such as an Apple A5/A6 processor, a Qualcomm Snapdragon processor, or TI OMAP processor. Note that many of the customer versions of such processors are modified and varied; however, they may support or recognize a specific instructions set that performs defined algorithms as set forth by the processor licensor. Here, the microarchitectural implementation may vary, but the architectural function of the processor is usually consistent. Certain details regarding the architecture and operation of processor 1310 in one implementation will be discussed further below to provide an illustrative example.

Processor 1310, in one embodiment, communicates with a system memory 1315. As an illustrative example, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. In various implementations the individual memory devices may be of different package types such as single die package (SDP), dual die package (DDP) or quad die package (Q17P). These devices, in some embodiments, are directly soldered onto a motherboard to provide a lower profile solution, while in other embodiments the devices are configured as one or more memory modules that in turn couple to the motherboard by a given connector. And of course, other memory implementations are possible such as other types of memory modules, e.g., dual inline memory modules (DIMMs) of different varieties including but not limited to microDIMMs, Mini-DIMMs. In a particular illustrative embodiment, memory is sized between 2 GB and 16 GB, and may be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage 1320 may also couple to processor 1310. In various embodiments, to enable a thinner and lighter system design as well as to improve system responsiveness, this mass storage may be implemented via a SSD. However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 13, a flash device 1322 may be coupled to processor 1310, e.g., via a serial peripheral interface (SPI). This flash device may provide for non-volatile storage of system software, including a basic input/output software (BIOS) as well as other firmware of the system.

In various embodiments, mass storage of the system is implemented by a SSD alone or as a disk, optical or other drive with an SSD cache. In some embodiments, the mass storage is implemented as a SSD or as a HDD along with a restore (RST) cache module. In various implementations, the HDD provides for storage of between 320 GB-4 terabytes (TB) and upward while the RST cache is implemented with a SSD having a capacity of 24 GB-256 GB. Note that such SSD cache may be configured as a single level cache (SLC) or multi-level cache (MLC) option to provide an appropriate level of responsiveness. In a SSD-only option, the module may be accommodated in various locations such as in a mSATA or NGFF slot. As an example, an SSD has a capacity ranging from 120 GB-1 TB.

Various input/output (IO) devices may be present within system 1300. Specifically shown in the embodiment of FIG. 13 is a display 1324 which may be a high definition LCD or LED panel configured within a lid portion of the chassis. This display panel may also provide for a touch screen 1325, e.g., adapted externally over the display panel such that via a user's interaction with this touch screen, user inputs can be provided to the system to enable desired operations, e.g., with regard to the display of information, accessing of information and so forth. In one embodiment, display 1324 may be coupled to processor 1310 via a display interconnect that can be implemented as a high performance graphics interconnect. Touch screen 1325 may be coupled to processor 1310 via another interconnect, which in an embodiment can be an I²C interconnect. As further shown in FIG. 13, in addition to touch screen 1325, user input by way of touch can also occur via a touch pad 1330 which may be configured within the chassis and may also be coupled to the same I²C interconnect as touch screen 1325.

The display panel may operate in multiple modes. In a first mode, the display panel can be arranged in a transparent state in which the display panel is transparent to visible light. In various embodiments, the majority of the display panel may be a display except for a bezel around the periphery. When the system is operated in a notebook mode and the display panel is operated in a transparent state, a user may view information that is presented on the display panel while also being able to view objects behind the display. In addition, information displayed on the display panel may be viewed by a user positioned behind the display. Or the operating state of the display panel can be an opaque state in which visible light does not transmit through the display panel.

In a tablet mode the system is folded shut such that the back display surface of the display panel comes to rest in a position such that it faces outwardly towards a user, when the bottom surface of the base panel is rested on a surface or held by the user. In the tablet mode of operation, the back display surface performs the role of a display and user interface, as this surface may have touch screen functionality and may perform other known functions of a conventional touch screen device, such as a tablet device. To this end, the display panel may include a transparency-adjusting layer that is disposed between a touch screen layer and a front display surface. In some embodiments the transparency-adjusting layer may be an electrochromic layer (EC), a LCD layer, or a combination of EC and LCD layers.

In various embodiments, the display can be of different sizes, e.g., an 11.6" or a 13.3" screen, and may have a 16:9 aspect ratio, and at least 300 nits brightness. Also the display may be of full high definition (HD) resolution (at least 1920× 1080p), be compatible with an embedded display port (eDP), and be a low power panel with panel self refresh.

As to touch screen capabilities, the system may provide for a display multi-touch panel that is multi-touch capacitive and being at least 5 finger capable. And in some embodiments, the display may be 10 finger capable. In one embodiment, the touch screen is accommodated within a damage and scratch-resistant glass and coating (e.g., Gorilla Glass™ or Gorilla Glass 2™) for low friction to reduce "finger burn" and avoid "finger skipping". To provide for an enhanced touch experience and responsiveness, the touch panel, in some implementations, has multi-touch functionality, such as less than 2 frames (30 Hz) per static view during pinch zoom, and single-touch functionality of less than 1 cm per frame (30 Hz) with 200 ms (lag on finger to pointer). The display, in some implementations, supports edge-to-edge glass with a minimal screen bezel that is also flush with the panel surface, and limited IO interference when using multi-touch.

For perceptual computing and other purposes, various sensors may be present within the system and may be coupled to processor 1310 in different manners. Certain inertial and environmental sensors may couple to processor 1310 through a sensor hub 1340, e.g., via an I²C interconnect. In the embodiment shown in FIG. 13, these sensors may include an accelerometer 1341, an ambient light sensor (ALS) 1342, a compass 1343 and a gyroscope 1344. Other environmental sensors may include one or more thermal sensors 1346 which in some embodiments couple to processor 1310 via a system management bus (SMBus) bus.

Using the various inertial and environmental sensors present in a platform, many different use cases may be realized. These use cases enable advanced computing operations including perceptual computing and also allow for enhancements with regard to power management/battery life, security, and system responsiveness.

For example with regard to power management/battery life issues, based at least on part on information from an ambient light sensor, the ambient light conditions in a location of the platform are determined and intensity of the display controlled accordingly. Thus, power consumed in operating the display is reduced in certain light conditions.

As to security operations, based on context information obtained from the sensors such as location information, it may be determined whether a user is allowed to access certain secure documents. For example, a user may be permitted to access such documents at a work place or a home location. However, the user is prevented from accessing such documents when the platform is present at a public location. This determination, in one embodiment, is based on location information, e.g., determined via a GPS sensor or camera recognition of landmarks. Other security operations may include providing for pairing of devices within a close range of each other, e.g., a portable platform as described herein and a user's desktop computer, mobile telephone or so forth. Certain sharing, in some implementations, are realized via near field communication when these devices are so paired. However, when the devices exceed a certain range, such sharing may be disabled. Furthermore, when pairing a platform as described herein and a smartphone, an alarm may be configured to be triggered when the devices move more than a predetermined distance from each other, when in a public location. In contrast, when these paired devices are in a safe location, e.g., a work place or home location, the devices may exceed this predetermined limit without triggering such alarm.

Responsiveness may also be enhanced using the sensor information. For example, even when a platform is in a low power state, the sensors may still be enabled to run at a relatively low frequency. Accordingly, any changes in a location of the platform, e.g., as determined by inertial sensors, GPS sensor, or so forth is determined. If no such changes have been registered, a faster connection to a previous wireless hub such as a Wi-Fi™ access point or similar wireless enabler occurs, as there is no need to scan for available wireless network resources in this case. Thus, a greater level of responsiveness when waking from a low power state is achieved.

It is to be understood that many other use cases may be enabled using sensor information obtained via the integrated sensors within a platform as described herein, and the above examples are only for purposes of illustration. Using a system as described herein, a perceptual computing system may allow for the addition of alternative input modalities, including gesture recognition, and enable the system to sense user operations and intent.

In some embodiments one or more infrared or other heat sensing elements, or any other element for sensing the presence or movement of a user may be present. Such sensing elements may include multiple different elements working together, working in sequence, or both. For example, sensing elements include elements that provide initial sensing, such as light or sound projection, followed by sensing for gesture detection by, for example, an ultrasonic time of flight camera or a patterned light camera.

Also in some embodiments, the system includes a light generator to produce an illuminated line. In some embodiments, this line provides a visual cue regarding a virtual boundary, namely an imaginary or virtual location in space, where action of the user to pass or break through the virtual boundary or plane is interpreted as an intent to engage with the computing system. In some embodiments, the illuminated line may change colors as the computing system transitions into different states with regard to the user. The illuminated line may be used to provide a visual cue for the user of a virtual boundary in space, and may be used by the system to determine transitions in state of the computer with regard to the user, including determining when the user wishes to engage with the computer.

In some embodiments, the computer senses user position and operates to interpret the movement of a hand of the user through the virtual boundary as a gesture indicating an intention of the user to engage with the computer. In some embodiments, upon the user passing through the virtual line or plane the light generated by the light generator may change, thereby providing visual feedback to the user that the user has entered an area for providing gestures to provide input to the computer.

Display screens may provide visual indications of transitions of state of the computing system with regard to a user. In some embodiments, a first screen is provided in a first state in which the presence of a user is sensed by the system, such as through use of one or more of the sensing elements.

In some implementations, the system acts to sense user identity, such as by facial recognition. Here, transition to a second screen may be provided in a second state, in which the computing system has recognized the user identity, where this second the screen provides visual feedback to the user that the user has transitioned into a new state. Transition to a third screen may occur in a third state in which the user has confirmed recognition of the user.

In some embodiments, the computing system may use a transition mechanism to determine a location of a virtual boundary for a user, where the location of the virtual boundary may vary with user and context. The computing system may generate a light, such as an illuminated line, to indicate the virtual boundary for engaging with the system. In some embodiments, the computing system may be in a waiting state, and the light may be produced in a first color. The computing system may detect whether the user has reached past the virtual boundary, such as by sensing the presence and movement of the user using sensing elements.

In some embodiments, if the user has been detected as having crossed the virtual boundary (such as the hands of the user being closer to the computing system than the virtual boundary line), the computing system may transition to a state for receiving gesture inputs from the user, where a mechanism to indicate the transition may include the light indicating the virtual boundary changing to a second color.

In some embodiments, the computing system may then determine whether gesture movement is detected. If gesture movement is detected, the computing system may proceed with a gesture recognition process, which may include the use of data from a gesture data library, which may reside in memory in the computing device or may be otherwise accessed by the computing device.

If a gesture of the user is recognized, the computing system may perform a function in response to the input, and return to receive additional gestures if the user is within the virtual boundary. In some embodiments, if the gesture is not recognized, the computing system may transition into an error state, where a mechanism to indicate the error state may include the light indicating the virtual boundary changing to a third color, with the system returning to receive additional gestures if the user is within the virtual boundary for engaging with the computing system.

As mentioned above, in other embodiments the system can be configured as a convertible tablet system that can be used in at least two different modes, a tablet mode and a notebook mode. The convertible system may have two panels, namely a display panel and a base panel such that in the tablet mode the two panels are disposed in a stack on top of one another. In the tablet mode, the display panel faces outwardly and may provide touch screen functionality as found in conventional tablets. In the notebook mode, the two panels may be arranged in an open clamshell configuration.

In various embodiments, the accelerometer may be a 3-axis accelerometer having data rates of at least 50 Hz. A gyroscope may also be included, which can be a 3-axis gyroscope. In addition, an e-compass/magnetometer may be present. Also, one or more proximity sensors may be provided (e.g., for lid open to sense when a person is in proximity (or not) to the system and adjust power/performance to extend battery life). For some OS's Sensor Fusion capability including the accelerometer, gyroscope, and compass may provide enhanced features. In addition, via a sensor hub having a real-time clock (RTC), a wake from sensors mechanism may be realized to receive sensor input when a remainder of the system is in a low power state.

In some embodiments, an internal lid/display open switch or sensor to indicate when the lid is closed/open, and can be used to place the system into Connected Standby or automatically wake from Connected Standby state. Other system sensors can include ACPI sensors for internal processor, memory, and skin temperature monitoring to enable changes to processor and system operating states based on sensed parameters.

In an embodiment, the OS may be a Microsoft® Windows® 8 OS that implements Connected Standby (also referred to herein as Win8 CS). Windows 8 Connected Standby or another OS having a similar state can provide, via a platform as described herein, very low ultra idle power to enable applications to remain connected, e.g., to a cloud-based location, at very low power consumption. The platform can supports 3 power states, namely screen on (normal); Connected Standby (as a default "off" state); and shutdown (zero watts of power consumption). Thus in the Connected Standby state, the platform is logically on (at minimal power levels) even though the screen is off. In such a platform, power management can be made to be transparent to applications and maintain constant connectivity, in part due to offload technology to enable the lowest powered component to perform an operation.

Also seen in FIG. 13, various peripheral devices may couple to processor 1310 via a low pin count (LPC) interconnect. In the embodiment shown, various components can be coupled through an embedded controller 1335. Such components can include a keyboard 1336 (e.g., coupled via a PS2 interface), a fan 1337, and a thermal sensor 1339. In some embodiments, touch pad 1330 may also couple to EC 1335 via a PS2 interface. In addition, a security processor such as a trusted platform module (TPM) 1338 in accordance with the Trusted Computing Group (TCG) TPM Specification Version 1.2, dated Oct. 2, 2003, may also couple to processor 1310 via this LPC interconnect. However, understand the scope of the present invention is not limited in this regard and secure processing and storage of secure information may be in another protected location such as a static random access memory (SRAM) in a security coprocessor, or as encrypted data blobs that are only decrypted when protected by a secure enclave (SE) processor mode.

In a particular implementation, peripheral ports may include a high definition media interface (HDMI) connector (which can be of different form factors such as full size, mini or micro); one or more USB ports, such as full-size external ports in accordance with the Universal Serial Bus Revision 3.0 Specification (November 2008), with at least one powered for charging of USB devices (such as smartphones) when the system is in Connected Standby state and is plugged into AC wall power. In addition, one or more Thunderbolt™ ports can be provided. Other ports may include an externally accessible card reader such as a full size SD-XC card reader and/or a SIM card reader for WWAN (e.g., an 8 pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

System 1300 can communicate with external devices in a variety of manners, including wirelessly. In the embodiment shown in FIG. 13, various wireless modules, each of which can correspond to a radio configured for a particular wireless communication protocol, are present. One manner for wireless communication in a short range such as a near field may be via a near field communication (NFC) unit 1345 which may communicate, in one embodiment with processor 1310 via an SMBus. Note that via this NFC unit 1345, devices in close proximity to each other can communicate. For example, a user can enable system 1300 to communicate with another (e.g.,) portable device such as a smartphone of the user via adapting the two devices together in close relation and enabling transfer of information such as identification information payment information, data such as image data or so forth. Wireless power transfer may also be performed using a NFC system.

Using the NFC unit described herein, users can bump devices side-to-side and place devices side-by-side for near field coupling functions (such as near field communication and wireless power transfer (WPT)) by leveraging the coupling between coils of one or more of such devices. More specifically, embodiments provide devices with strategically shaped, and placed, ferrite materials, to provide for better coupling of the coils. Each coil has an inductance associated with it, which can be chosen in conjunction with the resistive, capacitive, and other features of the system to enable a common resonant frequency for the system.

As further seen in FIG. 13, additional wireless units can include other short range wireless engines including a WLAN unit 1350 and a Bluetooth unit 1352. Using WLAN unit 1350, Wi-Fi™ communications in accordance with a given Institute of Electrical and Electronics Engineers (IEEE) 802.11 standard can be realized, while via Bluetooth unit 1352, short range communications via a Bluetooth protocol can occur. These units may communicate with processor 1310 via, e.g., a USB link or a universal asynchronous receiver transmitter (UART) link. Or these units may couple to processor 1310 via an interconnect according to a Peripheral Component Interconnect Express™ (PCIe™) protocol, e.g., in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit 1356 which in turn may couple to a subscriber identity module (SIM) 1357. In addition, to enable receipt and use of location information, a GPS module 1355 may also be present. Note that in the embodiment shown in FIG. 13, WWAN unit 1356 and an integrated capture device such as a camera module 1354 may communicate via a given USB protocol such as a USB 2.0 or 3.0 link, or a UART or I²C protocol. Again the actual physical connection of these units can be via adaptation of a NGFF add-in card to an NGFF connector configured on the motherboard.

In a particular embodiment, wireless functionality can be provided modularly, e.g., with a WiFi™ 802.11ac solution (e.g., add-in card that is backward compatible with IEEE 802.11abgn) with support for Windows 8 CS. This card can be configured in an internal slot (e.g., via an NGFF adapter). An additional module may provide for Bluetooth capability (e.g., Bluetooth 4.0 with backwards compatibility) as well as Intel® Wireless Display functionality. In addition NFC support may be provided via a separate device or multi-function device, and can be positioned as an example, in a front right portion of the chassis for easy access. A still additional module may be a WWAN device that can provide support for 3G/4G/LTE and GPS. This module can be implemented in an internal (e.g., NGFF) slot. Integrated antenna support can be provided for WiFi™, Bluetooth, WWAN, NFC and GPS, enabling seamless transition from WiFi™ to WWAN radios, wireless gigabit (WiGig) in accordance with the Wireless Gigabit Specification (July 2010), and vice versa.

As described above, an integrated camera can be incorporated in the lid. As one example, this camera can be a high resolution camera, e.g., having a resolution of at least 2.0 megapixels (MP) and extending to 6.0 MP and beyond.

To provide for audio inputs and outputs, an audio processor can be implemented via a digital signal processor (DSP) 1360, which may couple to processor 1310 via a high definition audio (HDA) link. Similarly, DSP 1360 may communicate with an integrated coder/decoder (CODEC) and amplifier 1362 that in turn may couple to output speakers 1363 which may be implemented within the chassis. Similarly, amplifier and CODEC 1362 can be coupled to receive audio inputs from a microphone 1365 which in an embodiment can be implemented via dual array microphones (such as a digital microphone array) to provide for high quality audio inputs to enable voice-activated control of various operations within the system. Note also that audio outputs can be provided from amplifier/CODEC 1362 to a headphone jack 1364. Although shown with these particular components in the embodiment of FIG. 13, understand the scope of the present invention is not limited in this regard.

In a particular embodiment, the digital audio codec and amplifier are capable of driving the stereo headphone jack, stereo microphone jack, an internal microphone array and stereo speakers. In different implementations, the codec can be integrated into an audio DSP or coupled via an HD audio path to a peripheral controller hub (PCH). In some implementations, in addition to integrated stereo speakers, one or more bass speakers can be provided, and the speaker solution can support DTS audio.

In some embodiments, processor 1310 may be powered by an external voltage regulator (VR) and multiple internal voltage regulators that are integrated inside the processor die, referred to as fully integrated voltage regulators (FIVRs). The use of multiple FIVRs in the processor enables the grouping of components into separate power planes, such that power is regulated and supplied by the FIVR to only those components in the group. During power management, a given power plane of one FIVR may be powered down or off when the processor is placed into a certain low power state, while another power plane of another FIVR remains active, or fully powered.

In one embodiment, a sustain power plane can be used during some deep sleep states to power on the I/O pins for several I/O signals, such as the interface between the processor and a PCH, the interface with the external VR and the interface with EC 1335. This sustain power plane also powers an on-die voltage regulator that supports the on-board SRAM or other cache memory in which the processor context is stored during the sleep state. The sustain power plane is also used to power on the processor's wakeup logic that monitors and processes the various wakeup source signals.

During power management, while other power planes are powered down or off when the processor enters certain deep sleep states, the sustain power plane remains powered on to support the above-referenced components. However, this can lead to unnecessary power consumption or dissipation when those components are not needed. To this end, embodiments may provide a connected standby sleep state to maintain processor context using a dedicated power plane. In one embodiment, the connected standby sleep state facilitates processor wakeup using resources of a PCH which itself may be present in a package with the processor. In one embodiment, the connected standby sleep state facilitates sustaining processor architectural functions in the PCH until processor wakeup, this enabling turning off all of the unnecessary processor components that were previously left powered on during deep sleep states, including turning off all of the clocks. In one embodiment, the PCH contains a time stamp counter (TSC) and connected standby logic for controlling the system during the connected standby state. The integrated voltage regulator for the sustain power plane may reside on the PCH as well.

In an embodiment, during the connected standby state, an integrated voltage regulator may function as a dedicated power plane that remains powered on to support the dedicated cache memory in which the processor context is stored such as critical state variables when the processor enters the deep sleep states and connected standby state. This critical state may include state variables associated with the architectural, micro-architectural, debug state, and/or similar state variables associated with the processor.

The wakeup source signals from EC 1335 may be sent to the PCH instead of the processor during the connected standby state so that the PCH can manage the wakeup processing instead of the processor. In addition, the TSC is maintained in the PCH to facilitate sustaining processor architectural functions. Although shown with these particular components in the embodiment of FIG. 13, understand the scope of the present invention is not limited in this regard.

Power control in the processor can lead to enhanced power savings. For example, power can be dynamically allocate between cores, individual cores can change frequency/voltage, and multiple deep low power states can be provided to enable very low power consumption. In addition, dynamic control of the cores or independent core portions can provide for reduced power consumption by powering off components when they are not being used.

Some implementations may provide a specific power management IC (PMIC) to control platform power. Using this solution, a system may see very low (e.g., less than 5%) battery degradation over an extended duration (e.g., 16 hours) when in a given standby state, such as when in a Win8 Connected Standby state. In a Win8 idle state a battery life exceeding, e.g., 9 hours may be realized (e.g., at 150 nits). As to video playback, a long battery life can be realized, e.g., full HD video playback can occur for a minimum of 6 hours. A platform in one implementation may have an energy capacity of, e.g., 35 watt hours (Whr) for a Win8 CS using an SSD and (e.g.,) 40-44 Whr for Win8 CS using an HDD with a RST cache configuration.

A particular implementation may provide support for 15 W nominal CPU thermal design power (TDP), with a configurable CPU TDP of up to approximately 25 W TDP design point. The platform may include minimal vents owing to the thermal features described above. In addition, the platform is pillow-friendly (in that no hot air is blowing at the user). Different maximum temperature points can be realized depending on the chassis material. In one implementation of a plastic chassis (at least having to lid or base portion of plastic), the maximum operating temperature can be 52 degrees Celsius (C). And for an implementation of a metal chassis, the maximum operating temperature can be 46° C.

In different implementations, a security module such as a TPM can be integrated into a processor or can be a discrete device such as a TPM 2.0 device. With an integrated security module, also referred to as Platform Trust Technology (PTT), BIOS/firmware can be enabled to expose certain hardware features for certain security features, including secure instructions, secure boot, Intel® Anti-Theft Technology, Intel® Identity Protection Technology, Intel® Trusted Execution Technology (TXT), and Intel® Manageability Engine Technology along with secure user interfaces such as a secure keyboard and display.

The embodiments described herein provide several advantages and differences relative to current systems. The distributed coherent and memory fabric architecture facilitates concurrent access to caching agents and non-caching IO agents through use of parallel pipelines, including support for shared access to cachelines by both caching and non-caching agents while maintaining memory coherency and enforcing correct ordering. The use of parallel pipelines facilities greater memory throughput than available under conventional architectures employing a single pipeline. By providing shared access to memory resources for both caching and non-caching agents, the architectures offer improvements over existing approaches employing separate pipelines for caching and non-caching agents that are operated independently and do not provide shared access. By decoupling address match hardware and ordering hardware, the architectures enable high performance, distributed conflict checking for I/O requests while retaining correct ordering behavior. By mapping multiple virtual channels to fewer conflict classes using the described method above, the architectures reduce the area overhead associated that typical systems normally incur with dedicated resources for each virtual channel, while achieving the required QoS.

The following examples pertain to further embodiments. In an embodiment, a method includes initiating a transaction from an initiator comprising a processor core or CPU in a computer system including a memory fabric and an I/O interconnect hierarchy comprising at least one I/O fabric, the transaction requesting to access a protected asset associated with a target for the transaction that is accessed via the memory fabric or an I/O fabric, generating, external to the initiator, immutable security attributes based on an identity of the initiator in combination with indicia identifying the initiator is operating in a trusted execution mode, wherein the indicia is stored external to the initiator, forwarding the transaction and the immutable security attributes toward the target, implementing an access policy for the protected asset under which access to the protected asset is permitted for a transaction initiated by an initiator if the initiator is executing in one or more trusted execution modes, and enforcing the access policy through use of the immutable security attributes. In an embodiment, the method further includes setting, while operating the initiator in a trusted execution mode, current mode indicia external to the initiator indicating a current execution mode of the initiator is a trusted execution mode. In an embodiment, the transaction initiated from the initiator comprises a second transaction, and the method further includes initiating a first transaction from the initiator prior to the second transaction that includes indicia identifying the transaction is for updating a mode register external to the initiator with a current execution mode of the initiator, generating immutable security attributes corresponding to the first transaction, forwarding the security attributes to the mode register, and updating the mode register with indicia indicating the current execution mode of the initiator. In an embodiment, the method further includes enforcing an access policy through use of the immutable security attributes that permits access to the mode register if the immutable security attributes indicate access to the mode register is allowed.

In an embodiment of the method the generation of the immutable security attributes is further based on security indicia generated by the initiator. In an embodiment, generation of the immutable security attributes is further based on a determination that the transaction is an I/O transaction of a predetermined type. In an embodiment, the trusted execution mode is a microcode execution mode. In an embodiment, the target comprises system memory operatively coupled to the memory fabric via a memory controller, and the access policy is enforced at the memory controller.

In an embodiment, the initiator comprises a processor core coupled to a system agent, and wherein the security attributes are generated by embedded logic in the system agent. In an embodiment, the security attributes are generated by embedded logic in the memory fabric.

In accordance with further embodiments, apparatus are configured with means for performing the foregoing method operations. In an embodiment, an apparatus includes a plurality of processor cores; at least one processor core configured to execute in multiple execution modes including at least one trusted execution mode and at least one untrusted execution mode, a memory fabric, to which each of the processor cores is operatively coupled, an I/O interconnect hierarchy comprising a plurality of I/O fabrics, an I/O interconnect hierarchy comprising a plurality of I/O fabrics, including a primary I/O fabric occupying a top level of the hierarchy and operatively coupled to the memory fabric via an I/O interface, a plurality of I/O devices, each coupled to an I/O fabric, a security attributes generation unit, external to each of the processor cores, configured to generate immutable security attributes for transactions as a function of input data received at a plurality of inputs, and a plurality of access policy enforcement blocks, each configured to enforce an access policy under which a transaction is allowed access to a protected asset associated with the access policy enforcement block based on security attributes generated for the transaction. Upon operation of the apparatus in a computer system including system memory operatively coupled to the memory fabric via a memory controller the apparatus is configured to initiate a transaction from an initiator comprising a processor core executing in a trusted execution mode, the transaction comprising a request to access a protected asset associated with a target comprising one of system memory or one of the I/O devices, generate, via the security attributes generation unit, immutable security attributes based on an identity of the initiator in combination with indicia identifying the initiator is operating in a trusted execution mode, forward the transaction and the immutable security attributes toward the target, and enforce, via the access policy enforcement block associated with the protected asset and through use of the immutable security attributes, the access policy for the protected asset.

In an embodiment of the apparatus, the plurality of inputs to the security attributes generation unit include an input indicating the transaction is secure that is sent separate from the transaction. In an embodiment, the plurality of inputs to the security attributes generation unit include indicia identifying the transaction as a privileged I/O transaction. In an embodiment, the plurality of processor cores are coupled to a system agent, and the security attributes generation unit comprises logic embedded in the system agent.

In an embodiment, the apparatus further includes a mode register coupled to an input of the security attributes generation unit, wherein the mode register is configured to stored indicia identifying an execution mode of the processor core. In an embodiment, the apparatus further includes a sideband channel via which execution mode indicia is transferred to the mode register. In an embodiment, wherein the transaction initiated from the initiator comprises a second transaction, and wherein upon operation of the apparatus in the computer system the apparatus is further configured to initiate a first transaction prior to the second transaction that includes indicia identifying the transaction is for updating the mode register with a current execution mode of the initiator, generate security attributes at the security attribute generation unit corresponding to the first transaction, forward the security attributes to the mode register, and update the mode register with indicia indicating the current execution mode of the initiator. In an embodiment the apparatus further includes access policy enforcement logic configured to permit or deny access to the mode register based on indicia included in security attributes for a message sent to the mode register.

In accordance with further embodiments, an SOC includes a CPU including a plurality of processor cores, a system agent, to which the CPU is operatively coupled, the system agent including a security attributes generation unit configured to generate immutable security attributes for transactions initiated from the CPU, the security attributes identifying an execution mode of the CPU for each transaction, an I/O interconnect hierarchy comprising a plurality of I/O fabrics, including a primary I/O fabric occupying a top level of the hierarchy and coupled to the system agent, a plurality of I/O devices, each coupled to an I/O fabric, at least one of the I/O devices associated with one or more and protected assets, and a plurality of access policy enforcement blocks, each configured to enforce an access policy for one or more protected assets associated with an I/O device under which a transaction having a target comprising the I/O device is allowed or denied access to a protected asset associated with the I/O device based on security attributes generated for the transaction. During operation of the SoC in a computer system, a transaction originating from the CPU is not allowed access to a protected asset if the CPU is operating in a untrusted execution mode.

In an embodiment of the SoC, the system agent further includes a mode register in which indicia identifying an execution mode of the CPU is stored, and wherein the security attributes generation unit is coupled to the mode register and employs the execution mode indicia as an input used to generate security attributes for a transaction. In an embodiment, the SoC is configured to implement a multiple level security scheme for accessing protected assets under which a first transaction is initiated from the CPU while operating in a trusted execution mode to update the execution mode indicia in the mode register to indicate the CPU is operating in a trusted execution mode, and a second transaction is initiated from the CPU to access a protected asset while operating in a trusted execution mode. In an embodiment, the I/O interconnect hierarchy comprises a first I/O fabric employing a first protocol to which a second I/O fabric having a second protocol is coupled via a bridge having a mapper configured to map security attributes between the first protocol and the second protocol.

In accordance with further embodiments, a system for implement aspects of the foregoing methods, apparatus, and SoC is provided. In an embodiment, the system includes an SOC having a central processing unit (CPU) including a plurality of processor cores, a system agent, to which each of the processor cores is operatively coupled, the system agent including a memory fabric coupled to a memory controller and a security attributes generation unit configured to generate immutable security attributes for transactions initiated from the CPU, an I/O interconnect hierarchy comprising a plurality of I/O fabrics, each coupled to at least one other I/O fabric, the I/O hierarchy including a primary I/O fabric occupying a top level of the hierarchy and coupled to the system agent, a plurality of I/O devices, each coupled to an I/O fabric, including a flash memory controller, and a plurality of access policy enforcement blocks, each configured to enforce an access policy for one or more protected assets associated with an I/O device under which a transaction having a target comprising the I/O device is allowed or denied access to a protected asset in the I/O device based on security attributes generated for the transaction. The system further includes system memory, operatively coupled to the memory controller, and flash memory, operatively coupled to the flash memory controller having a first plurality of instructions comprising a BIOS and a second plurality of instructions comprising an operating system stored therein. Upon operation of the system, the SoC is configured to initiate a transaction from an initiator comprising a processor core executing in a trusted mode, the transaction comprising a request to access a protected asset associated with a target I/O device, generate, via the security attributes generation unit, immutable security attributes based on an identity of the initiator in combination with indicia identifying the initiator is operating in a trusted execution mode, forward the transaction and the immutable security attributes toward the target I/O device, and enforce, via the access policy enforcement block associated with the target I/O device and through use of the immutable security attributes, the access policy for the protected asset.

In an embodiment, the system agent further includes a mode register coupled to an input of the security attributes generation unit, wherein the mode register is configured to store indicia identifying an execution mode of the processor core. In an embodiment, the transaction initiated from the initiator comprises a second transaction, and wherein upon operation of the system, the SoC is configured to initiate a first transaction prior to the second transaction that includes indicia identifying the transaction is for updating the mode register with a current execution mode of the initiator, generate immutable security attributes at the security attribute generation unit corresponding to the first transaction, forward the immutable security attributes to the mode register, and update the mode register with indicia indicating the current execution mode of the initiator.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a non-transient machine readable medium.

A module or component as used herein refers to any combination of hardware, software, and/or firmware. As an example, a module or component includes hardware, such as a micro-controller, associated with a non-transitory medium to store code adapted to be executed by the micro-controller. Therefore, reference to a module or a component, in one embodiment, refers to the hardware, which is specifically configured to recognize and/or execute the code to be held on a non-transitory medium. Furthermore, in another embodiment, use of a module or component refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module and/or component boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'operatively coupled,' in one embodiment, refers to components, logic, and/or modules that are coupled to one another either directly (e.g., via physical signal paths) or indirectly (e.g., via one or more components, interfaces, controllers, etc. interposed therebetween). In addition, in some embodiments, components, logic, and/or modules may be operatively coupled when an apparatus or system is operating. For example, switch fabrics are configured to switchably couple signals received at various ingress interfaces for the switch fabric to selected egress interfaces for the switch fabric, thus selectively coupling components coupled to such ingress and egress interfaces in communication.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage. Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A method comprising:
   initiating a transaction from an initiator comprising processing element in a computing device including a memory fabric and an Input/Output (I/O) interconnect hierarchy comprising at least one I/O fabric, the transaction requesting to access a protected asset associated with a target for the transaction;
   generating, external to the initiator, immutable security attributes based on an identity of the initiator in combination with indicia identifying the initiator is operating in a trusted execution mode, wherein the indicia is stored external to the initiator;
   forwarding the transaction and the immutable security attributes toward the target;
   implementing an access policy for the protected asset under which access to the protected asset is permitted for a transaction initiated by an initiator if the initiator is executing in one or more trusted execution modes; and
   enforcing the access policy through use of the immutable security attributes.

2. The method of claim 1, further comprising setting, while operating the initiator in a trusted execution mode, current mode indicia external to the initiator indicating a current execution mode of the initiator is a trusted execution mode.

3. The method of claim 2, wherein the transaction initiated from the initiator comprises a second transaction, the method further comprising:
   initiating a first transaction from the initiator prior to the second transaction that includes indicia identifying the transaction is for updating a mode register external to the initiator with a current execution mode of the initiator;
   generating immutable security attributes corresponding to the first transaction;
   forwarding the security attributes to the mode register; and
   updating the mode register with indicia indicating the current execution mode of the initiator.

4. The method of claim 3, further comprising enforcing an access policy through use of the immutable security attributes that permits access to the mode register if the immutable security attributes indicate access to the mode register is allowed.

5. The method of claim 1, wherein generation of the immutable security attributes is further based on security indicia generated by the initiator.

6. The method of claim 1, wherein generation of the immutable security attributes is further based on a determination that the transaction is an I/O transaction of a predetermined type.

7. The method of claim 1, wherein the trusted execution mode is a microcode execution mode.

8. The method of claim 1, wherein the target comprises system memory operatively coupled to the memory fabric via a memory controller, and the access policy is enforced at the memory controller.

9. The method of claim 1, wherein the initiator comprises a processor core coupled to a system agent, and wherein the security attributes are generated by embedded logic in the system agent.

10. The method of claim 1, wherein the security attributes are generated by embedded logic in the memory fabric.

11. An apparatus comprising:
    a plurality of processor cores, at least one processor core configured to execute in multiple execution modes including at least one trusted execution mode and at least one untrusted execution mode;
    a memory fabric, to which each of the processor cores is operatively coupled;
    an Input/Output (I/O) interconnect hierarchy;
    a security attributes generation unit, external to each of the processor cores, configured to generate immutable security attributes for transactions as a function of input data received at a plurality of inputs; and
    a plurality of access policy enforcement blocks, each configured to enforce an access policy under which a transaction is allowed access to a protected asset associated with the access policy enforcement block based on security attributes generated for the transaction,
    wherein upon operation of the apparatus in a computer system including system memory operatively coupled to the memory fabric via a memory controller the apparatus is configured to,
    initiate a transaction from an initiator comprising a processor core executing in a trusted execution mode, the transaction comprising a request to access a protected asset associated with a target comprising one of system memory or one of the I/O devices;
    generate, via the security attributes generation unit, immutable security attributes based on an identity of the initiator in combination with indicia identifying the initiator is operating in a trusted execution mode; and
    forward the transaction and the immutable security attributes toward the target.

12. The apparatus of claim 11, wherein the plurality of inputs to the security attributes generation unit include an input indicating the transaction is secure that is sent separate from the transaction.

13. The apparatus of claim 11, wherein the plurality of inputs to the security attributes generation unit include indicia identifying the transaction as a privileged I/O transaction.

14. The apparatus of claim 11, further comprising a mode register coupled to an input of the security attributes generation unit, wherein the mode register is configured to stored indicia identifying an execution mode of the processor core.

15. The apparatus of claim 14, further comprising a sideband channel via which execution mode indicia is transferred to the mode register.

16. The apparatus of claim 15, wherein the transaction initiated from the initiator comprises a second transaction, and wherein upon operation of the apparatus in the computer system the apparatus is further configured to,
- initiate a first transaction prior to the second transaction that includes indicia identifying the transaction is for updating the mode register with a current execution mode of the initiator;
- generate security attributes at the security attribute generation unit corresponding to the first transaction;
- forward the security attributes to the mode register; and
- update the mode register with indicia indicating the current execution mode of the initiator.

17. The apparatus of claim 14, further comprising access policy enforcement logic configured to permit or deny access to the mode register based on indicia included in security attributes for a message sent to the mode register.

18. The apparatus of claim 11, wherein the plurality of processor cores are coupled to a system agent, and the security attributes generation unit comprises logic embedded in the system agent.

19. A system comprising:
a system on a chip (SoC), including,
- a central processing unit (CPU) including a plurality of processor cores;
- a system agent, to which each of the processor cores is operatively coupled, the system agent including a memory fabric coupled to a memory controller and a security attributes generation unit configured to generate immutable security attributes for transactions initiated from the CPU;
- an Input/Output (I/O) interconnect hierarchy comprising a plurality of I/O fabrics, each coupled to at least one other I/O fabric, the I/O hierarchy including a primary I/O fabric occupying a top level of the hierarchy and coupled to the system agent;
- a plurality of I/O devices, each coupled to an I/O fabric, including a flash memory controller; and
- a plurality of access policy enforcement blocks, each configured to enforce an access policy for one or more protected assets associated with an I/O device under which a transaction having a target comprising the I/O device is allowed or denied access to a protected asset in the I/O device based on security attributes generated for the transaction;

system memory, operatively coupled to the memory controller; and
flash memory, operatively coupled to the flash memory controller having a first plurality of instructions comprising a BIOS and a second plurality of instructions comprising an operating system stored therein;
wherein, upon operation of the system, the SoC is configured to,
- initiate a transaction from an initiator comprising a processor core executing in a trusted mode, the transaction comprising a request to access a protected asset associated with a target I/O device;
- generate, via the security attributes generation unit, immutable security attributes based on an identity of the initiator in combination with indicia identifying the initiator is operating in a trusted execution mode;
- forward the transaction and the immutable security attributes toward the target I/O device; and
- enforce, via the access policy enforcement block associated with the target I/O device and through use of the immutable security attributes, the access policy for the protected asset.

20. The system of claim 19, wherein the system agent further comprises a mode register coupled to an input of the security attributes generation unit, wherein the mode register is configured to store indicia identifying an execution mode of the processor core.

21. The system of claim 20, wherein the transaction initiated from the initiator comprises a second transaction, and wherein upon operation of the system, the SoC is configured to,
- initiate a first transaction prior to the second transaction that includes indicia identifying the transaction is for updating the mode register with a current execution mode of the initiator;
- generate immutable security attributes at the security attribute generation unit corresponding to the first transaction;
- forward the immutable security attributes to the mode register; and
- update the mode register with indicia indicating the current execution mode of the initiator.

* * * * *